United States Patent
Yamada et al.

(10) Patent No.: US 9,590,778 B2
(45) Date of Patent: *Mar. 7, 2017

(54) MOBILE STATION APPARATUS, MOBILE COMMUNICATION AND COMMUNICATION METHOD USING SEARCH SPACE TO TRANSMIT AND DECODE PDCCH

(71) Applicant: HUAWEI TECHNOLOGIES CO., LTD., Shenzhen, Guangdong (CN)

(72) Inventors: Shohei Yamada, Osaka (JP); Tatsushi Aiba, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

This patent is subject to a terminal disclaimer.

(21) Appl. No.: 14/537,024

(22) Filed: Nov. 10, 2014

(65) Prior Publication Data

US 2015/0063277 A1  Mar. 5, 2015

Related U.S. Application Data

(60) Continuation of application No. 13/184,381, filed on Jul. 15, 2011, now Pat. No. 8,885,582, which is a
(Continued)

(30) Foreign Application Priority Data

Apr. 24, 2008 (JP) .................. 2008-113788

(51) Int. Cl.
*H04L 5/00* (2006.01)
*H04W 72/04* (2009.01)
*H04W 8/26* (2009.01)

(52) U.S. Cl.
CPC .......... *H04L 5/0037* (2013.01); *H04L 5/0089* (2013.01); *H04L 5/0096* (2013.01);
(Continued)

(58) Field of Classification Search
CPC .. H04W 72/042; H04L 5/0089; H04L 5/0037; H04L 5/0096; H04L 5/0023
See application file for complete search history.

(56) References Cited

U.S. PATENT DOCUMENTS 7,269,145 B2  9/2007  Koo et al.
7,733,827 B2  6/2010  Kim et al.
(Continued)

FOREIGN PATENT DOCUMENTS

CA  2710157 A1  7/2009
CN  1890901 A  1/2007
(Continued)

OTHER PUBLICATIONS

3GPP TS 36.213 V8.2.0, 3rd Generation Partnership Project-;Technical Specification Group Radio Access Network; Evolved Universal Terrestrial Radio Access (E-UTRA); Physical layer procedures(Release 8), Mar. 2008, total 30 pages.
(Continued)

Primary Examiner — Habte Mered
(74) Attorney, Agent, or Firm — Huawei Technologies Co., Ltd.

(57) ABSTRACT

In a mobile communication system in which an space of a physical downlink control channel (PDCCH) for a mobile station apparatus to search is defined based on a mobile station identity assigned from a base station apparatus, the base station apparatus places a PDCCH including a first mobile station identity or a PDCCH including a second mobile station identity in a search space of a PDCCH corresponding to the first mobile station identity when the base station apparatus assigns a plurality of mobile station identities to the mobile station apparatus, and when a plurality of mobile station identities is assigned from the base station apparatus, the mobile station apparatus performs decoding processing of the PDCCH including the first
(Continued)

|  | DYNAMIC PDCCH | PERSISTENT PDCCH |
|---|---|---|
| CFR DEDICATED REQUEST EXISTS | ONE SHOT CFR ONLY | PERIODIC CFR ONLY |
| CFR REQUEST EXISTS UL-SCH EXISTS | ONE SHOT CFR AND ONE SHOT UL-SCH | PERIODIC CFR AND PERSISTENT UL-SCH |
| NO CFR | ONE SHOT UL-SCH | PERSISTENT UL-SCH |
| CFR DEDICATED REQUEST EXISTS NO RESOURCE ALLOCATION | RESERVE | HALT OF PERIODIC CFR |
| CFR REQUEST EXISTS UL-SCH EXISTS NO RESOURCE ALLOCATION | RESERVE | HALT OF PERIODIC CFR AND PERSISTENT UL-SCH |
| NO CFR NO RESOURCE ALLOCATION | RESERVE | HALT OF PERSISTENT UL-SCH | mobile station identity and the PDCCH including the second mobile station identity in the search space of the PDCCH corresponding to the first mobile station identity.

8 Claims, 15 Drawing Sheets

Related U.S. Application Data division of application No. 12/739,182, filed as application No. PCT/JP2009/057520 on Apr. 14, 2009, now Pat. No. 8,559,384.

(52) U.S. Cl.
CPC ......... *H04W 72/042* (2013.01); *H04L 5/0023* (2013.01); *H04W 8/26* (2013.01)

(56) References Cited

U.S. PATENT DOCUMENTS

| | | | |
|---|---|---|---|
| 7,873,004 B2 | 1/2011 | Lee et al. |
| 7,899,026 B2 | 3/2011 | Chun et al. |
| 7,948,941 B2 | 5/2011 | Kwon et al. |
| 7,979,769 B2 | 7/2011 | Chun et al. |
| 8,155,067 B2 | 4/2012 | Wang et al. |
| 8,195,943 B2 | 6/2012 | Tenny |
| 8,274,944 B2 | 9/2012 | Kwon et al. |
| 8,289,911 B2 | 10/2012 | Chun et al. |
| 8,295,236 B2 | 10/2012 | Ishii et al. |
| 8,885,582 B2 | 11/2014 | Yamada et al. |
| 2003/0106006 A1 | 6/2003 | Kwon et al. |
| 2007/0115871 A1 | 5/2007 | Zhang et al. |
| 2007/0226502 A1 | 9/2007 | Tenny |
| 2008/0232284 A1 | 9/2008 | Dalsgaard et al. |
| 2008/0235314 A1 | 9/2008 | Lee et al. |
| 2009/0088148 A1 | 4/2009 | Chung et al. |
| 2009/0149208 A1 | 6/2009 | Huttunen et al. |
| 2009/0168922 A1 | 7/2009 | Malladi et al. |
| 2009/0197630 A1 | 8/2009 | Ahn et al. |
| 2009/0201852 A1 | 8/2009 | Chen |
| 2009/0238091 A1 | 9/2009 | Kim et al. |
| 2009/0247178 A1 | 10/2009 | Lunden et al. |
| 2009/0257390 A1 | 10/2009 | Ji et al. |
| 2009/0257449 A1 | 10/2009 | Chen et al. |
| 2009/0287976 A1 | 11/2009 | Wang et al. |
| 2010/0002638 A1 | 1/2010 | Park et al. |
| 2010/0074230 A1 | 3/2010 | Ishii et al. |
| 2010/0085927 A1 | 4/2010 | Torsner et al. |
| 2010/0118798 A1 | 5/2010 | Chun et al. |
| 2010/0118803 A1 | 5/2010 | Ishii et al. |
| 2010/0208597 A1 | 8/2010 | Chun et al. |
| 2010/0208667 A1 | 8/2010 | Chun et al. |
| 2010/0220711 A1 | 9/2010 | Ishii |
| 2010/0238875 A1 | 9/2010 | Sung et al. |
| 2010/0279695 A1 | 11/2010 | Amirijoo et al. |
| 2011/0019637 A1 | 1/2011 | Ojala et al. |
| 2011/0083066 A1 | 4/2011 | Chung et al. |
| 2011/0124360 A1 | 5/2011 | Sågfors et al. |
| 2011/0182245 A1 | 7/2011 | Malkamaki et al. |
| 2011/0194502 A1 | 8/2011 | Sung et al. |
| 2012/0147836 A1 | 6/2012 | Ishii et al. |
| 2012/0236811 A1 | 9/2012 | Ishii et al. |

FOREIGN PATENT DOCUMENTS

| | | |
|---|---|---|
| CN | 101005326 A | 7/2007 |
| EP | 2131622 A1 | 12/2009 |
| JP | 2011010315 A | 1/2011 |
| WO | 2009082333 A1 | 7/2009 |

OTHER PUBLICATIONS

3GPP TSG RAN1#50 R1-073373, "Search Space Definition for L1/L2 Control Channels", Motorola, Aug. 20-24, 2007, total 11 pages.
TSG-RAN WG2 Meeting #61 Tdoc R2-080765, "Control of semi persistent scheduling", Ericsson, Samsung, Feb. 11-15, 2008, total 2 pages.
TSG-RAN WG1 #52bis R1-081522, "Summary of email discussion on DL control signaling",Ericsson, Mar. 31-Apr. 4, 2008, total 7 pages.
3GPP TSG RAN1 #52bis R1-081586(R1-081289), "PDCCH Search Space Assignment Hashing Function", Motorola, Mar. 31-Apr. 4, 2008, total 6 pages.
3GPP TSG-RAN WG1 Meeting #52bis R1-081593,"Proposed: intra-CCE REG EPRE requirement", Editor (Motorola), Change Request 36.213 CR 0005,V8.2.0, Mar. 31-Apr. 4, 2008, total 28 pages.
TSG-RAN WG1#52Bis R1-081396,"Downlink Multiplexing for Persistent and Dynamic scheduling", NEC Group,Mar. 31-Apr. 4, 2008, total 3 pages.
3GPP TS 36.300 V8.4.0,3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2(Release 8), Mar. 2008, total 126 pages.
R1-081101,"PDCCH blind decoding—Outcome of offline discussions",Discussion Moderator (Ericsson),Feb. 11, 2008,total 7 pages.
3GPP TSG RAN WG1 Meeting #52bis R1-081406,"PDCCH Allocation Based on Hashing Function Generation Method for PDCCH Blind Decoding",NTT DoCoMo,Mar. 31-Apr. 4, 2008,total 4 pages.
3GPP TSG-RAN WG1 #52bis R1-081547,"Power Offsets to Support PUSCH Data and Control Multiplexing", Alcatel-Lucent, Mar. 31-Apr. 4, 2008, total 4 pages.
3GPP TSG-RAN WG1 Meeting #52bis R1-081586,"36.213 PUCCH timing and other formatting and typo corrections", Editor (Motorola),36.213 CR 0003,V82.0, Mar. 31-Apr. 4, 2008, total 29 pages.

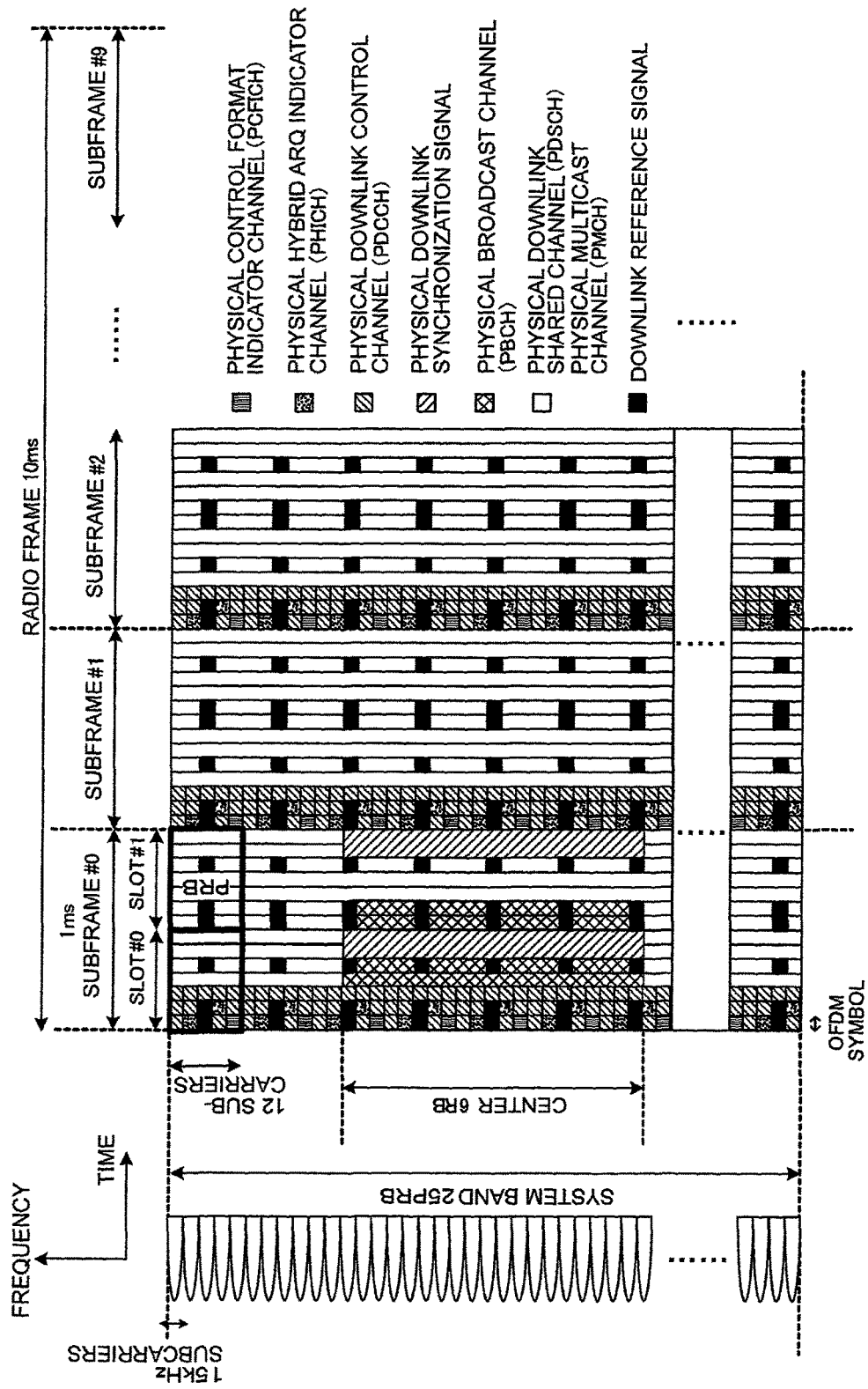

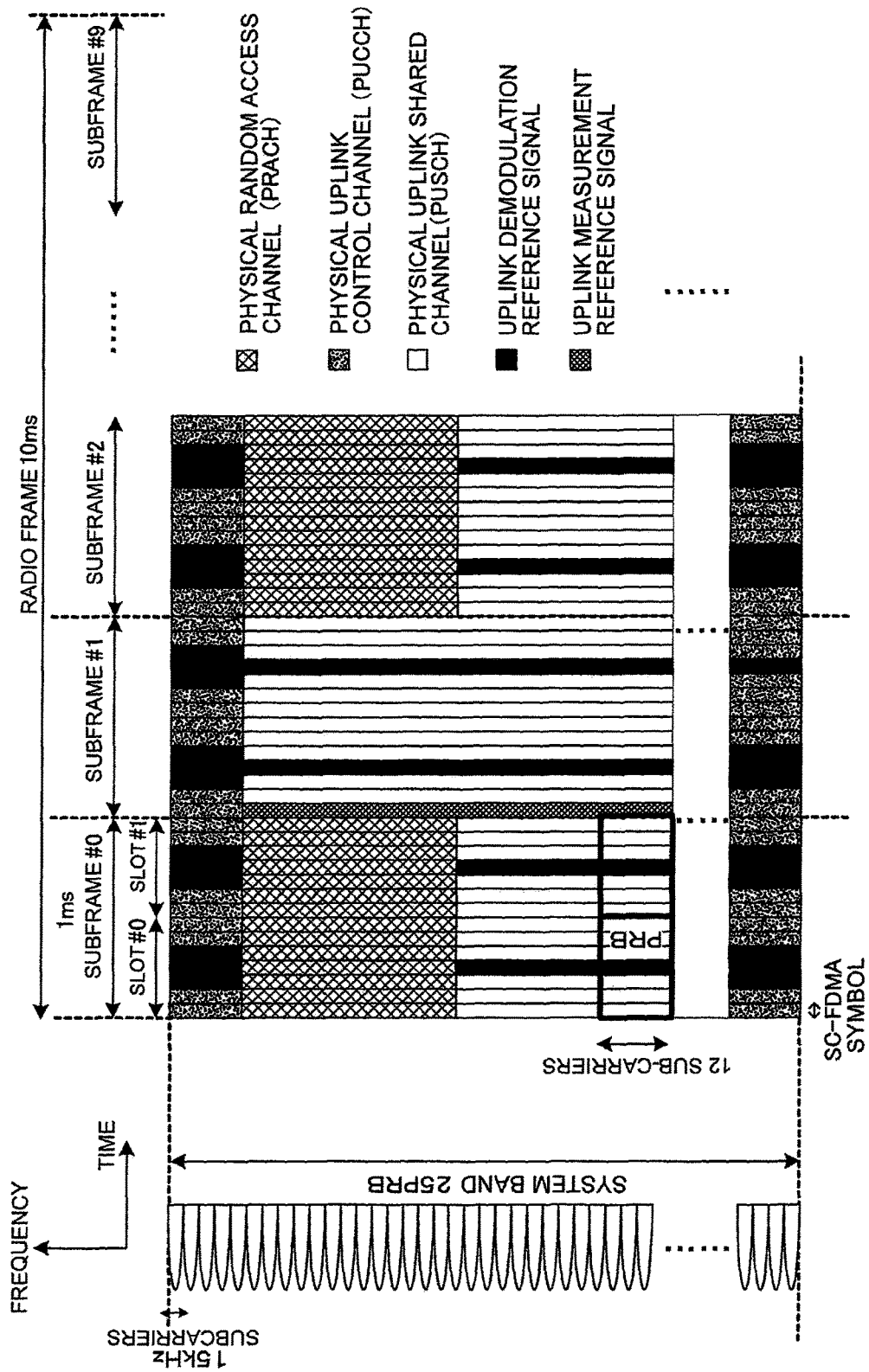

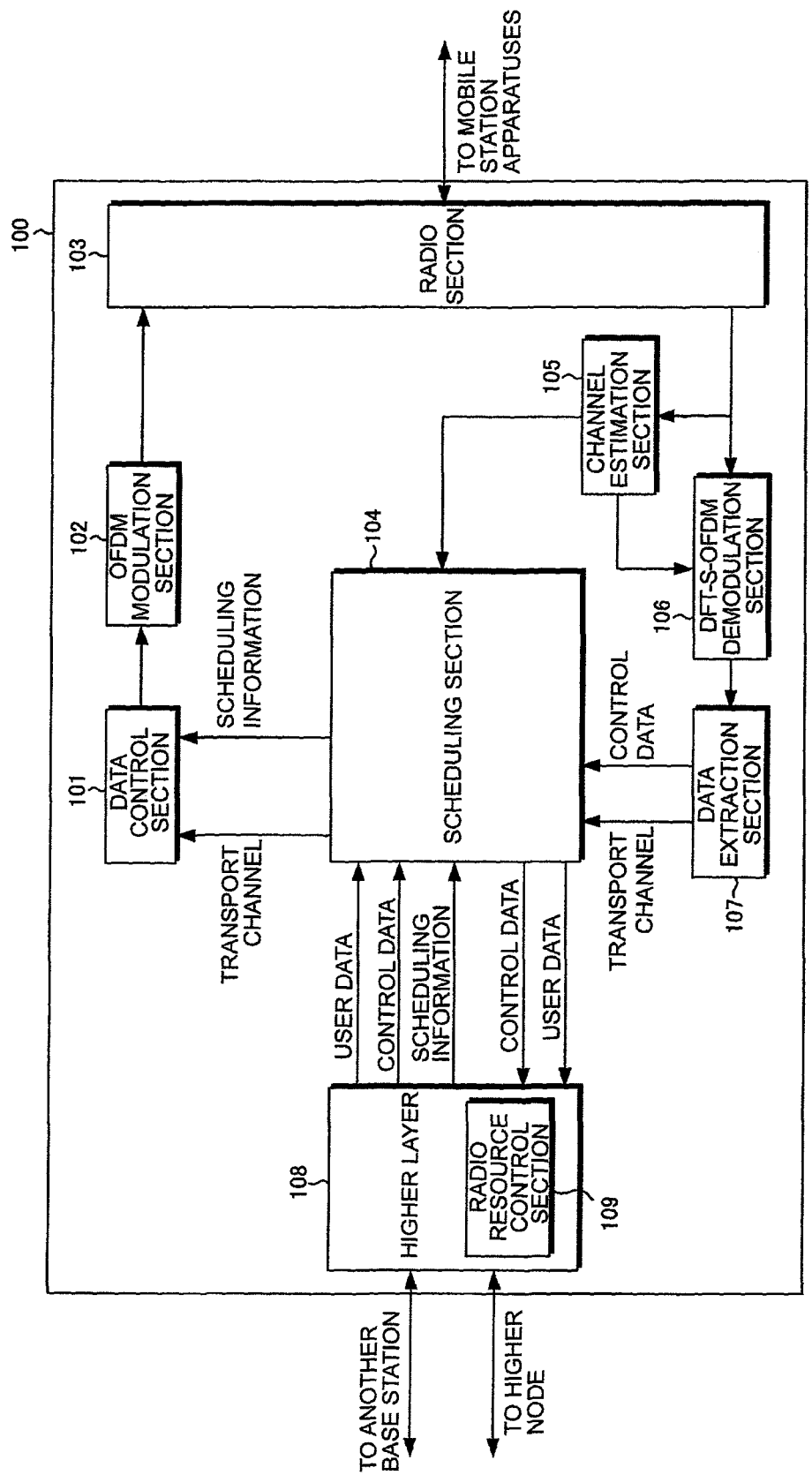

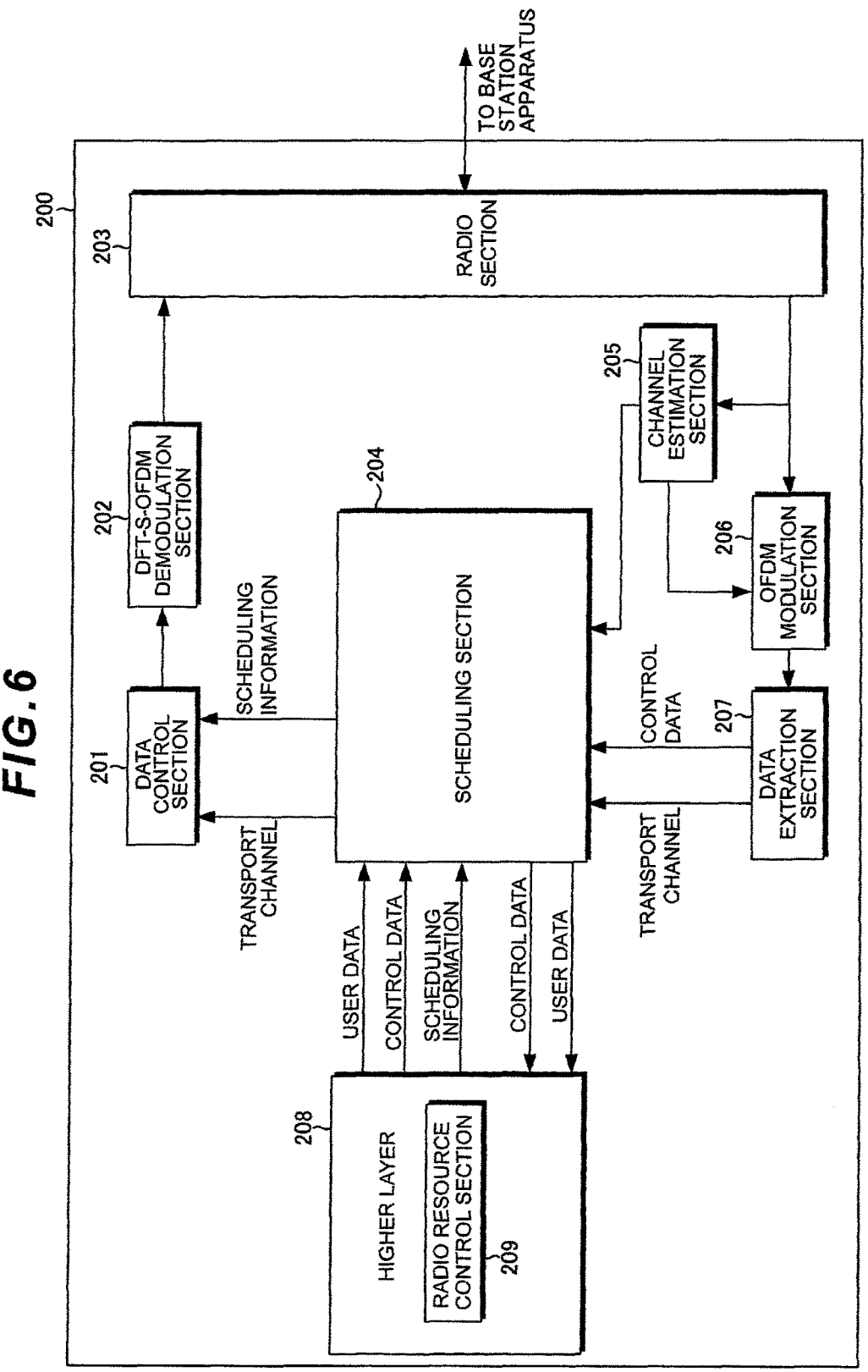

FIG.7

| | DYNAMIC PDCCH | PERSISTENT PDCCH |
|---|---|---|
| CFR DEDICATED REQUEST EXISTS | ONE SHOT CFR ONLY | PERIODIC CFR ONLY |
| CFR REQUEST EXISTS UL-SCH EXISTS | ONE SHOT CFR AND ONE SHOT UL-SCH | PERIODIC CFR AND PERSISTENT UL-SCH |
| NO CFR | ONE SHOT UL-SCH | PERSISTENT UL-SCH |
| CFR DEDICATED REQUEST EXISTS NO RESOURCE ALLOCATION | RESERVE | HALT OF PERIODIC CFR |
| CFR REQUEST EXISTS UL-SCH EXISTS NO RESOURCE ALLOCATION | RESERVE | HALT OF PERIODIC CFR AND PERSISTENT UL-SCH |
| NO CFR NO RESOURCE ALLOCATION | RESERVE | HALT OF PERSISTENT UL-SCH |

FIG.8

| | DYNAMIC PDCCH | PERSISTENT PDCCH |
|---|---|---|
| CFR REQUEST EXISTS<br>CFR DEDICATED REQUEST EXISTS | PERIODICAL CFR ONLY | RESERVE |
| CFR REQUEST EXISTS<br>UL-SCH EXISTS | ONE SHOT CFR AND ONE SHOT UL-SCH | PERIODIC CFR AND PERSISTENT UL-SCH |
| CFR REQUEST EXISTS<br>CFR DEDICATED REQUEST EXISTS | ONE SHOT CFR ONLY | PERIODIC CFR ONLY |
| NO CFR | ONE SHOT UL-SCH | PERSISTENT UL-SCH |
| NO CFR REQUEST<br>CFR DEDICATED REQUEST EXISTS<br>NO RESOURCE ALLOCATION | HALT OF PERIODIC CFR | HALT OF PERIODIC CFR AND PERSISTENT UL-SCH |
| CFR REQUEST EXISTS<br>UL-SCH EXISTS<br>NO RESOURCE ALLOCATION | RESERVE | HALT OF PERIODIC CFR AND PERSISTENT UL-SCH |
| CFR REQUEST EXISTS<br>CFR DEDICATED REQUEST EXISTS<br>NO RESOURCE ALLOCATION | RESERVE | HALT OF PERIODIC CFR |
| NO CFR<br>NO RESOURCE ALLOCATION | RESERVE | HALT OF PERSISTENT UL-SCH |

FIG.9

| | DYNAMIC PDCCH | PERSISTENT PDCCH | PERIODIC CFR PDCCH |
|---|---|---|---|
| CFR DEDICATED REQUEST EXITS | ONE SHOT CFR ONLY | RESERVE | PERIODIC CFR ONLY |
| CFR REQUEST EXISTS UL-SCH EXISTS | ONE SHOT CFR AND ONE SHOT UL-SCH | PERIODIC CFR AND PERSISTENT UL-SCH | PERIODIC CFR ONLY |
| NO CFR | ONE SHOT UL-SCH | PERSISTENT UL-SCH | PERIODIC CFR ONLY |
| CFR DEDICATED REQUEST EXITS NO RESOURCE ALLOCATION | RESERVE | RESERVE | HALT OF PERIODIC CFR |
| CFR REQUEST EXISTS UL-SCH EXISTS NO RESOURCE ALLOCATION | RESERVE | HALT OF PERIODIC CFR AND PERSISTENT UL-SCH | HALT OF PERIODIC CFR |
| NO CFR NO RESOURCE ALLOCATION | RESERVE | HALT OF PERSISTENT UL-SCH | HALT OF PERIODIC CFR |

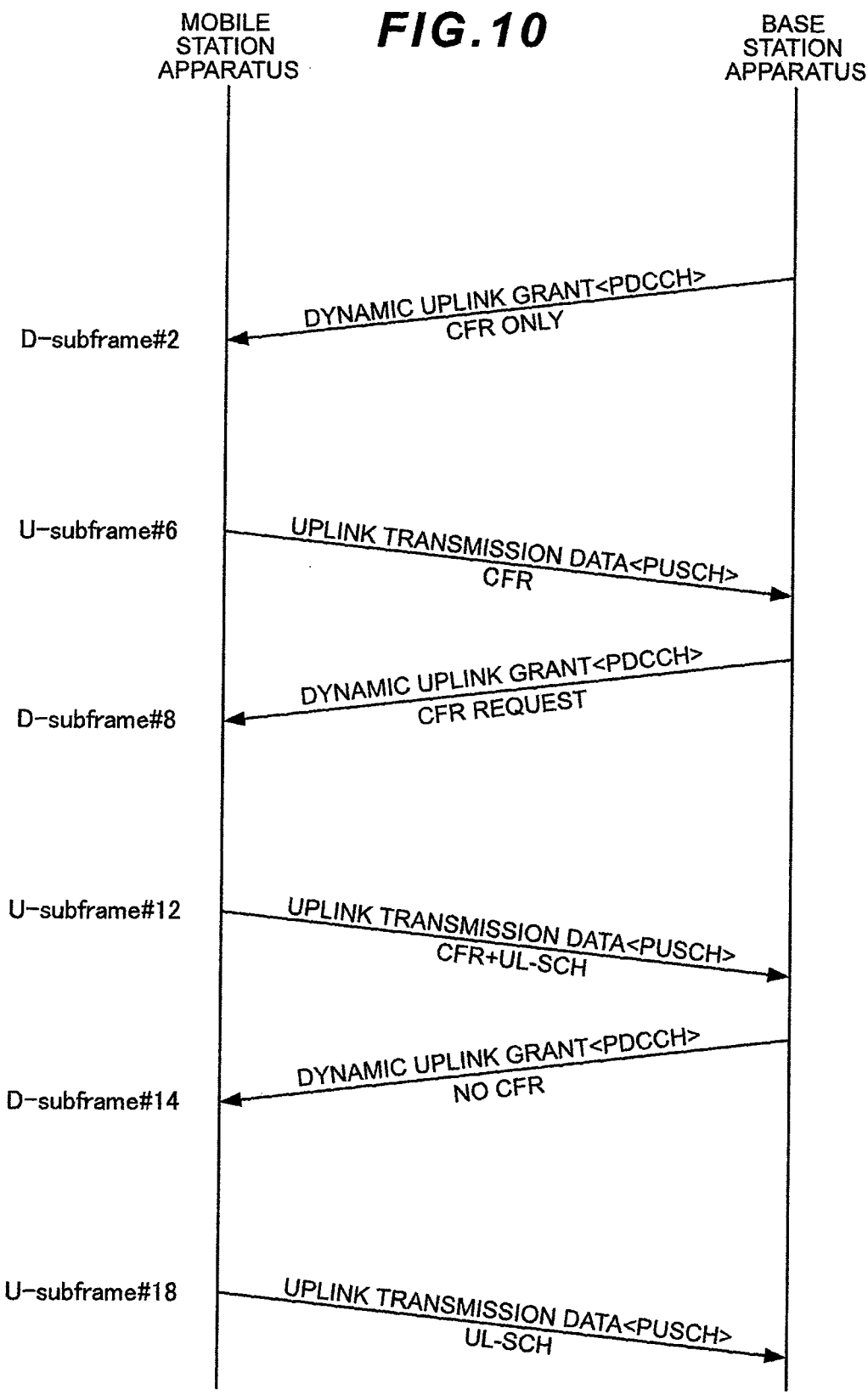

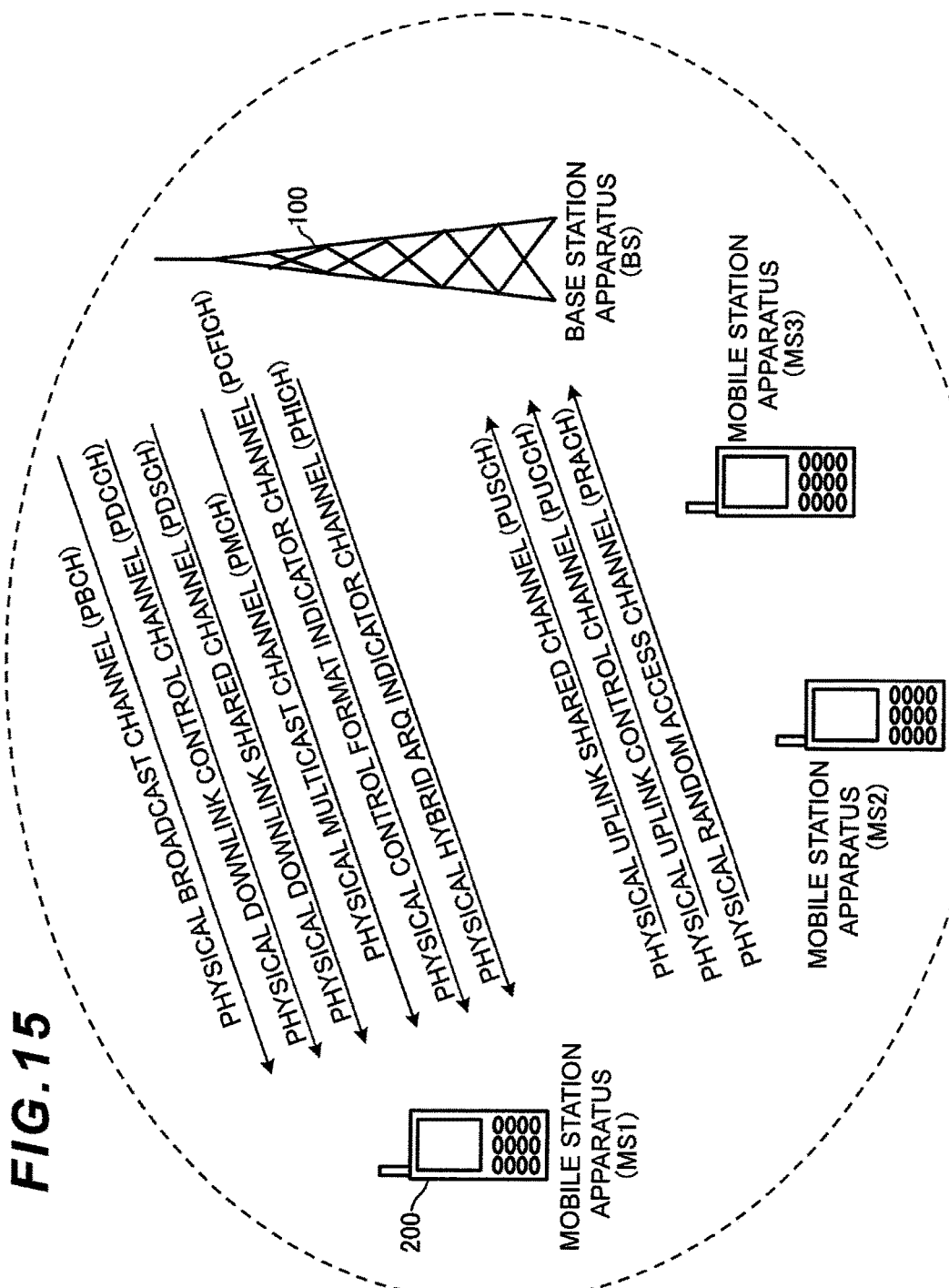

MOBILE STATION APPARATUS, MOBILE COMMUNICATION AND COMMUNICATION METHOD USING SEARCH SPACE TO TRANSMIT AND DECODE PDCCH

CROSS-REFERENCE TO RELATED APPLICATIONS

This application is a continuation of U.S. patent application Ser. No. 13/184,381, filed on Jul. 15, 2011, which is a divisional application of U.S. patent application Ser. No. 12/739,182, filed on Jun. 14, 2010. Application Ser. No. 12/739,182 is the U.S. National Stage Application of PCT Application No. PCT/JP2009/057520, filed on Apr. 14, 2009, which claims the benefit of priority to Japanese Patent Application No. 2008-113788, filed on Apr. 24, 2008. The entire contents of all of the above applications are incorporated herein by reference.

TECHNICAL FIELD

The present invention relates to a mobile station apparatus, mobile communication system, communication method and decoding processing of a physical downlink control channel.

BACKGROUND

3GPP ($3^{rd}$ Generation Partnership Project) is a project for discussing and preparing specifications of cellular telephone systems based on networks of evolved W-CDMA (Wideband-Code Division Multiple Access) and GSM (Global System for Mobile Communications). In 3GPP, the W-CDMA system has been standardized as the 3rd-generation cellular mobile communication system, and its service is started sequentially. Further, HSDPA (High-Speed Downlink Packet Access) with further increased communication rates has also been standardized, and its service is started. 3GPP is discussing evolution of the 3rd-generation radio access technique (Evolved Universal Terrestrial Radio Access: hereinafter, referred to as "EUTRA").

As a downlink communication system in EUTRA, proposed is an OFDMA (Orthogonal Frequency Division Multiple Access) system for multiplexing users using mutually orthogonal subcarriers. Further, in the OFDMA system are applied techniques such as an adaptive modulation/demodulation-error correcting scheme (AMCS: Adaptive Modulation and Coding Scheme) based on adaptive radio link control (Link Adaptation) such as channel coding, etc. AMCS is a scheme for switching between radio transmission parameters (hereinafter, referred to as an "AMC mode") such as an error correcting scheme, coding rate of error correction, the level of data modulation, etc. corresponding to channel quality of each mobile station apparatus so as to efficiently perform high-speed packet data transmission. The channel quality of each mobile station apparatus is sent back to the base station apparatus using CQI (channel Quality indicator) as feedback.

In OFDMA, it is possible to divide the communicable region into the frequency domain physically corresponding to subcarriers and time domain. A combination of some divided regions is referred to as a resource block, one or more resource blocks are allocated to each mobile station apparatus, and communications are performed while multiplexing a plurality of mobile station apparatuses. In order that the base station apparatus and each mobile station apparatus perform communications with optimal quality and rate in response to the request, required is physical resource block allocation and transmission scheme determination with consideration given to the channel quality of a frequency band associated with each subcarrier in each mobile station apparatus. Since the base station apparatus determines the transmission scheme and scheduling, to achieve the request, each mobile station apparatus gives feedback of channel quality for each frequency region to the base station apparatus. Further, when necessary, each mobile station apparatus transmits information indicative of a frequency region (for example, with good channel quality) selected by the mobile station apparatus to the base station apparatus as feedback.

Further, in EUTRA, to increase communication path capacity, it has been proposed to use transmission diversity such as SDM (Space Division Multiplexing), SFBC (Space-Frequency Block Diversity) and CDD (Cycle Delay Diversity) using MIMO (Multiple Input Multiple Output). MIMO is a generic name for Multiple Input Multiple Output systems or techniques, and is characterized in that a plurality of branches is used in input and output of radio signals to transmit, using a plurality of antennas on the transmission and reception sides. A unit of a signal sequence is referred to as a stream that can be transmitted in space multiplexing using the MIMO scheme. The number (Rank) of streams in MIMO communications is determined by the base station apparatus in consideration of channel state. The number (Rank) of streams requested by the mobile station apparatus is sent to the base station apparatus from the mobile station apparatus as feedback using RI (Rank Indicator).

Meanwhile, in using SDM on downlink, in order to accurately divide information of a plurality of streams transmitted from respective antennas, it is under review to perform preprocessing on a transmission signal sequence in advance (which is referred to as "precoding"). The information of precoding can be calculated based on channel state estimated by a mobile station apparatus, and the mobile station apparatus gives feedback to the base station apparatus using PMI (Precoding Matrix Indicator).

Thus, in order to achieve communications of optimal quality, each mobile station apparatus is required to transmit various kinds of information indicative of channel state to the base station apparatus as feedback. This channel feedback report CFR (channel state information) is formed of CQI, PMI, RI, etc. The number of bits and format of these channel feedback reports are designated from the base station apparatus to mobile station apparatuses corresponding to circumstances.

FIG. 15 is a diagram illustrating a channel structure in EUTRA (see Non-patent Document 1). The downlink of EUTRA is comprised of a physical broadcast channel (PBCH), physical downlink control channel (PDCCH), physical downlink shared channel (PDSCH), physical multicast channel (PMCH), physical control format indicator channel (PCFICH), and physical Hybrid ARQ indicator channel (PHICH).

Meanwhile, the uplink of EUTRA is comprised of a physical uplink shared channel (PUSCH), physical random access channel (PRACH), and physical uplink control channel (PUCCH).

In EUTRA, due to the nature of uplink single carrier, the mobile station apparatus cannot transmit signals concurrently using different channels (for example, PUSCH and PUCCH). When the mobile station apparatus transmits these channels at the same timing, the mobile station apparatus multiplexes the information using the definition of specifications, etc. to transmit on the determined channel, or transmits only either one of information according to the definition of specifications, etc. (does not transmit (drops) the other data).

Meanwhile, the PUSCH is mainly used to transmit uplink data, and the channel feedback report CFR is also transmitted using the PUSCH together with uplink data (UL-SCH) when the report is not transmitted using the PUCCH. In other words, the channel feedback report CFR is transmitted to the base station apparatus using the PUSCH or PUCCH. Generally, within a subframe, the PUSCH is assigned greater resources allocated to transmit the channel feedback report CFR than in the PUCCH, and enables transmission of more detailed channel feedback report CFR (when the number of physical resource blocks supported by the base station apparatus and mobile station apparatus is 65 to 110 (system bandwidth of 20 MHz), information of about 20 to 100 bits or more.) The mobile station apparatus can transmit information of only about 15 bits or less in a subframe using the PUCCH.

The mobile station apparatus is able to transmit the channel feedback report CFR periodically using the PUCCH. Further, the mobile station apparatus is able to transmit the channel feedback report CFR periodically or aperiodically using the PUSCH (Non-patent Documents 1 and 2). The base station apparatus sets persistent or permanent resources and transmission interval of the PUSCH on a mobile station apparatus using RRC signaling (Radio Resource control signal), and enables the mobile station apparatus to transmit the channel feedback report CFR periodically using the PUSCH. Further, by including a single bit of information for instructions for channel feedback report request (channel state report trigger) in an uplink transmission grant signal, the base station apparatus enables the mobile station apparatus to transmit the channel feedback report CFR and uplink data aperiodically (temporarily, in one shot) using the PUSCH.

Further, the mobile station apparatus is able to transmit only the channel feedback report CFR aperiodically using the PUSCH. Transmission of only the channel feedback report CFR is that the mobile station apparatus transmits only the channel feedback report CFR to the base station apparatus (where information of ACK/NACK, etc. is included), instead of concurrently transmitting the uplink data and channel feedback report CFR.

Meanwhile, in EUTRA, persistent or permanent PUSCH resources are scheduled for real-time traffic such as voice communications, and the mobile station apparatus is capable of transmitting the PUSCH for uplink data without an uplink transmission grant signal by PDCCH. This is called persistent scheduling. The base station apparatus sets transmission intervals on the mobile station apparatus using RRC signaling (Radio Resource Control signal), and activates persistent PUSCH allocation using a specific PDCCH. This specific PDCCH includes information for specifying a persistent PUSCH resource block, modulation and coding scheme, etc.

PRIOR ART DOCUMENT

Non-Patent Document

Non-patent Document 1: 3GPP TS (Technical Specification) 36.300, V8.4.0 (2008 March), Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

Non-patent Document 2: 3GPP TS (Technical Specification) 36.213, V8.2.0 (2008 March), Technical Specification Group Radio Access Network, physical Layer Procedures (Release 8)

DISCLOSURE OF INVENTION

Problems to be Solved by the Invention

However, in the conventional technique, there coexist PUSCH persistent scheduling for uplink data and PUSCH persistent allocation for the periodic channel feedback report CFR. Further, for signals required for these instructions, since different signals are used despite the signals having a commonality, there is a problem that the system design becomes complicated.

Further, since different signals are used for a method of starting periodic channel feedback and aperiodic channel feedback, and a method of starting transmission of only channel feedback and concurrent transmission of channel feedback and uplink data, there is a problem that it is not possible to efficiently switch therebetween. Meanwhile, when an uplink transmission grant signal in different format is newly introduced, another problem occurs that unnecessary processing (blind decoding processing) increases in mobile station apparatuses.

The present invention was made in view of such circumstances, and it is an object of the invention to provide a mobile station apparatus, mobile communication system and communication method for enabling a base station apparatus to request a channel feedback report and/or persistent scheduling to a mobile station apparatus using an efficient signal.

Means for Solving the Problem (1) To attain the above-mentioned object, the invention took measures as described below. In other words, a mobile station apparatus of the invention is a mobile station apparatus for which an space of a physical downlink control channel to search is defined based on a mobile station identity assigned from a base station apparatus, and is characterized by performing decoding processing of a physical downlink control channel including a first mobile station identity and a physical downlink control channel including a second mobile station identity in a search space of a physical downlink control channel corresponding to the first mobile station identity when a plurality of mobile station identities is assigned from the base station apparatus.

(2) Further, the mobile station apparatus of the invention is characterized in that the first mobile station identity is C-RNTI, and that the second mobile station identity is C-RNTI for persistent scheduling.

(3) Moreover, a mobile communication system of the invention is a mobile communication system in which an space of a physical downlink control channel for a mobile station apparatus to search is defined based on a mobile station identity assigned from a base station apparatus, and is characterized in that when the base station apparatus assigns a plurality of mobile station identities to the mobile station apparatus, the base station apparatus places a physical downlink control channel including a first mobile station identity or a physical downlink control channel including a second mobile station identity in a search space of a physical downlink control channel corresponding to the first mobile station identity, and that when a plurality of mobile station identities is assigned from the base station apparatus, the mobile station apparatus performs decoding processing of the physical downlink control channel including the first mobile station identity and the physical downlink control channel including the second mobile station identity in the search space of the physical downlink control channel corresponding to the first mobile station identity.

(4) Further, the mobile communication system of the invention is characterized in that the first mobile station identity is C-RNTI, and that the second mobile station identity is C-RNTI for persistent scheduling.

(5) Moreover, a mobile station apparatus of the invention is a mobile station apparatus for communicating with a base station apparatus, and is characterized by activating persistent resource allocation when a physical downlink control channel includes a particular mobile station identity, while deactivating the persistently allocated resources when the physical downlink control channel includes the particular mobile station identity, and resource allocation information is a beforehand determined value.

(6) Further, a mobile station apparatus of the invention is a mobile station apparatus for communicating with a base station apparatus, and is characterized by transmitting uplink data and a channel feedback report to the base station apparatus with persistently allocated uplink resources when a physical downlink control channel to allocate persistent resources includes a request for the channel feedback report, while transmitting uplink data to the base station apparatus with persistently allocated uplink resources when the physical downlink control channel does not include a request for the channel feedback report.

(7) Moreover, a communication method of the invention is a communication method in a mobile station apparatus for which an space of a physical downlink control channel to search is defined based on a mobile station identity assigned from a base station apparatus, and is characterized in that the mobile station apparatus performs decoding processing of a physical downlink control channel including a first mobile station identity and a physical downlink control channel including a second mobile station identity in a search space of a physical downlink control channel corresponding to the first mobile station identity when a plurality of mobile station identities is assigned from the base station apparatus.

(8) Further, the communication method of the invention is characterized in that the first mobile station identity is C-RNTI, and that the second mobile station identity is C-RNTI for persistent scheduling.

(9) Moreover, a communication method of the invention is a communication method in a mobile station apparatus for communicating with a base station apparatus, and is characterized that the mobile station apparatus activates persistent resource allocation when a physical downlink control channel includes a particular mobile station identity, while deactivating the persistently allocated resources when the physical downlink control channel includes the particular mobile station identity, and resource allocation information is a beforehand determined value.

(10) Further, a communication method of the invention is a communication method in a mobile station apparatus for communicating with a base station apparatus, and is characterized in that the mobile station apparatus transmits uplink data and a channel feedback report to the base station apparatus with persistently allocated uplink resources when a physical downlink control channel to allocate persistent resources includes a request for the channel feedback report, while transmitting uplink data to the base station apparatus with persistently allocated uplink resources when the physical downlink control channel does not include a request for the channel feedback report.

Advantageous Effect of the Invention

According to the invention, a mobile station apparatus selects either one of persistently allocated uplink resources and temporarily allocated uplink resources as uplink resources to transmit a channel feedback report based on information included in a downlink control signal, and is thereby capable of efficiently switching between persistently and temporarily allocated uplink resources. As a result, the mobile station apparatus is able to transmit a channel feedback report to the base station apparatus using an efficient signal. Further, it is possible to simplify the system design.

BRIEF DESCRIPTION OF DRAWINGS

FIG. 3 is a diagram illustrating a downlink frame structure in EUTRA;

FIG. 4 is a diagram illustrating an uplink frame structure in EUTRA;

FIG. 5 is a block diagram illustrating a schematic structure of a base station apparatus according to Embodiments;

FIG. 6 is a block diagram illustrating a schematic structure of a mobile station apparatus according to the Embodiments;

FIG. 7 is a diagram showing an example of operations of the mobile station apparatus corresponding to types of physical downlink control signals (PDCCH);

FIG. 8 is a diagram showing another example of operations of the mobile station apparatus corresponding to types of physical downlink control signals (PDCCH);

FIG. 9 is a diagram showing still another example of operations of the mobile station apparatus corresponding to types of physical downlink control signals (PDCCH);

FIG. 10 is a diagram showing an example of transmission/reception of signals between the mobile station apparatus and base station apparatus corresponding to dynamic physical downlink control signals (PDCCH) shown in FIG. 7;

FIG. 15 is a diagram illustrating a channel structure in EUTRA.

BEST MODE FOR CARRYING OUT THE INVENTION

Embodiments according to the invention will be described below with reference to drawings.

[Channel Structure]

Figure 1:
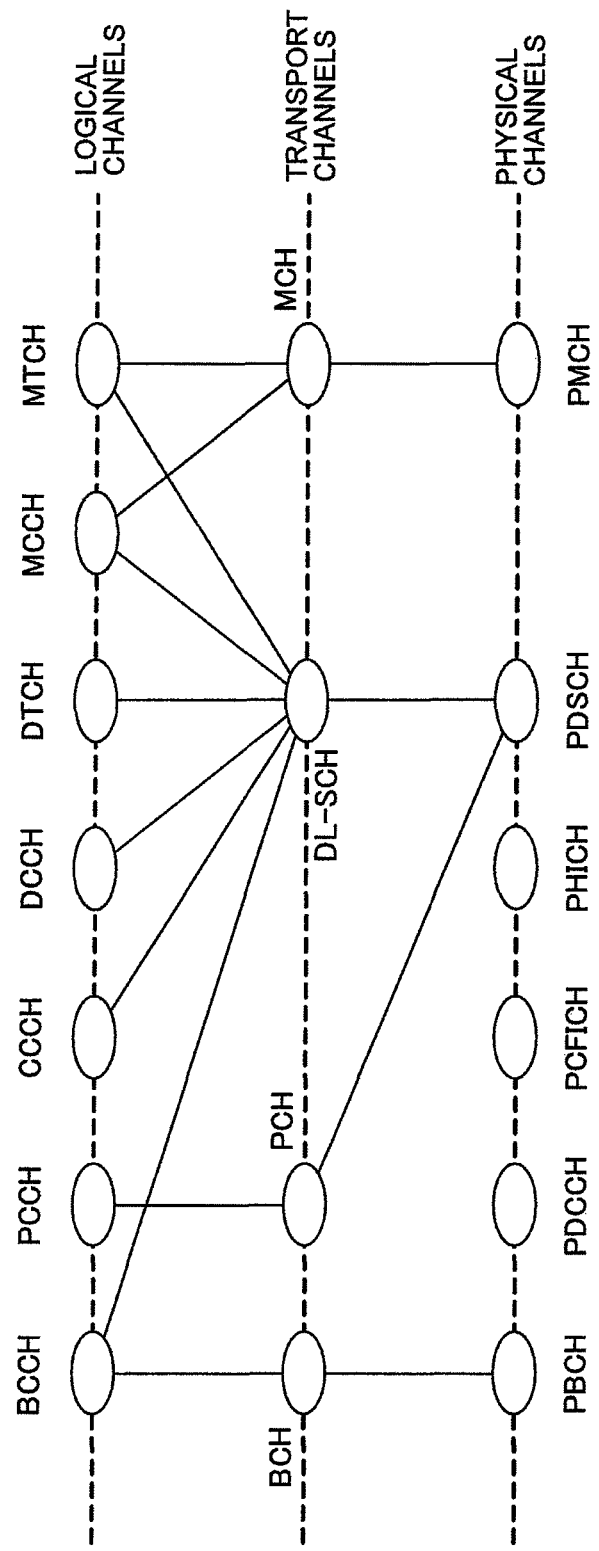
FIG. 1 is a diagram illustrating a structure of channels in EUTRA.
Figure 2:
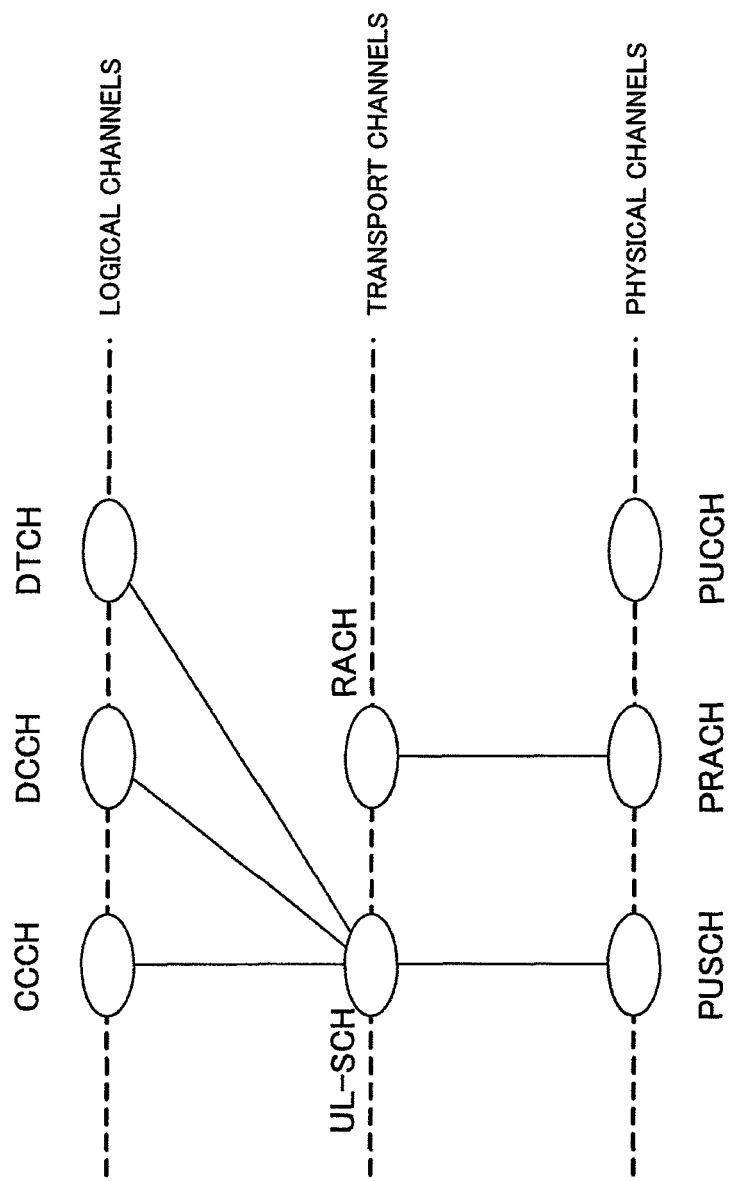
FIG. 2 is a diagram illustrating another structure of channels in EUTRA.

FIGS. 1 and 2 are diagrams illustrating a channel structure in EUTRA. As shown in FIGS. 1 and 2, these channels are classified into logical channels, transport channels and physical channels. FIG. 1 shows downlink channels, and FIG. 2 shows uplink channels. The logical channels are to define types of data transmission service transmitted and received in a Medium Access control (MAC) layer. The transport channels are to define what characteristics data transmitted in a radio interface has and how the data is transmitted. The physical channels are physical channels to convey the transport channels.

Among the logical channels are included a broadcast control channel (BCCH), paging control channel (PCCH), common control channel (CCCH), dedicated control channel (DCCH), dedicated traffic channel (DTCH), multicast control channel (MCCH), and multicast traffic channel (MTCH).

Among the transport channels are included a broadcast channel (BCH), paging channel (PCH), downlink shared channel (DL-SCH), multicast channel (MCH), uplink shared channel (UL-SCH), and random access channel (RACH).

Among the physical channels are included a physical broadcast channel (PBCH), physical downlink control channel (PDCCH), physical downlink shared channel (PDSCH), physical multicast channel (PMCH), physical uplink shared channel (PUSCH), physical random access channel (PRACH), physical uplink control channel (PUCCH), physical control format indicator channel (PCFICH), and physical Hybrid ARQ Indicator channel (PHICH). FIG. 15 shows the channels being transmitted and received.

The logical channels will be described below. The broadcast control channel (BCCH) is a downlink channel used to broadcast system control information. The paging control channel (PCCH) is a downlink channel used to transmit paging information, and is used when the network does not know the location cell of the mobile station apparatus. The common control channel (CCCH) is a channel used to transmit control information between mobile station apparatuses and network, and is used by mobile station apparatuses having no radio resource control (RRC) connection with the network.

The dedicated control channel (DCCH) is a point-to-point bi-directional channel and is a channel used to transmit dedicated control information between a mobile station apparatus and the network. The dedicated control channel (DCCH) is used by mobile station apparatuses having an RRC connection. The dedicated traffic channel (DTCH) is a point-to-point bi-directional channel, dedicated to one mobile station apparatus, and used to transfer user information (unicast data).

The multicast control channel (MCCH) is a downlink channel used to transmit MBMS control information from the network to mobile station apparatuses in a point-to-multipoint manner. This is used for Multimedia Broadcast Multicast Service (hereinafter referred to as "MBMS service") for offering point-to-multipoint service. Methods of transmitting MBMS service include Single-Cell Point-to-Multipoint (SCPTM) transmission and Multimedia Broadcast multicast service Single Frequency Network (MBSFN) transmission. The MBSFN transmission is simultaneous transmission technique implemented by a plurality of cells simultaneously transmitting an identifiable waveform (signal). Meanwhile, the SCPTM transmission is a method where one base station apparatus transmits MBMS service.

The multicast control channel (MCCH) is a downlink channel used to transmit MBMS control information from the network to mobile station apparatuses in a point-to-multipoint manner. Further, the multicast control channel (MCCH) is used for one or several multicast traffic channels (MTCHs). The multicast traffic channel (MTCH) is a downlink channel used to transmit traffic data (MBMS transmission data) from the network to mobile station apparatuses in a point-to-multipoint manner. In addition, the multicast control channel (MCCH) and multicast traffic channel (MTCH) are only used by mobile station apparatuses that receive MBMS.

The transport channels will be described below. The broadcast channel (BCH) needs to be broadcast to the entire cell in fixed and pre-defined transmission format. The downlink shared channel (DL-SCH) supports HARQ, dynamic adaptive radio link control, discontinuous reception (DRX) and MBMS transmission, and needs to be broadcast to the enter cell. Further, the downlink shared channel (DL-SCH) enables beam forming to be used, and supports dynamic resource allocation and semi-static resource allocation. The paging channel (PCH) supports DRX and needs to be broadcast to the entire cell. Further, the paging channel is mapped to physical resources which are used dynamically for the traffic channel and other control channels, i.e. physical downlink shared channel (PDSCH).

The multicast channel (MCH) needs to be broadcast to the entire cell. Further, the multicast channel (MCH) supports MBSFN (MBMS Single Frequency Network) combining of MBMS transmission from a plurality of cells, and semi-static resource allocation such as a time frame using a long cyclic prefix (CP). The uplink shared channel (UL-SCH) supports HARQ and dynamic adaptive radio link control. Further, the uplink shared channel (UL-SCH) enables beam forming to be used, and supports dynamic resource allocation and semi-static resource allocation. The random access channel (RACH) is to transmit limited control information, and has the risk of collisions.

The physical channels will be described next. The physical broadcast channel (PBCH) is to map the broadcast channel (BCH) at 40 ms intervals. The 40 ms timing is blindly detected (blind detection) (in other words, explicit signaling is not performed to indicate the timing.) Each subframe including the physical broadcast channel (PBCH) can be decoded (self-decodable) from the subframe, and is not divided into several times to transmit.

The physical downlink control channel (PDCCH) is used to inform the mobile station apparatus about resource allocation of the downlink shared channel (PDSCH), hybrid automatic repeat request (HARQ) information for downlink data, and uplink transmission grant (uplink grant) that is resource allocation of the physical uplink shared channel (PUSCH).

The physical downlink shared channel (PDSCH) is a channel use to transmit downlink data or paging information. The physical multicast channel (PMCH) is a channel used to transmit the multicast channel (MCH), and additionally assigned a downlink reference signal, uplink reference signal and physical downlink synchronization signal.

The physical uplink shared channel (PUSCH) is a channel mainly used to transmit uplink data (UL-SCH). When the base station apparatus performs scheduling on the mobile station apparatus, the PUSCH is also used to transmit a channel feedback report (CQI, PMI, RI), and HARQ acknowledgement (ACK)/negative acknowledgement (NACK) in response to downlink transmission.

The physical random access channel (PRACH) is a channel used to transmit a random access preamble, and has a guard time. The physical uplink control channel (PUCCH) is a channel used to transmit the channel feedback report (CFR), scheduling request (SR), HARQ acknowledge (ACK)/negative acknowledgement (NACK) in response to downlink transmission, etc.

The physical control format indicator channel (PCFICH) is a channel used to inform the mobile station apparatus of the number of OFDM symbols used for the physical downlink control channel (PDCCH), and transmitted in each subframe. The physical Hybrid ARQ indicator channel (PHICH) is used to transmit HARQ ACK/NACK in response to uplink transmission.

[Channel Mapping]

As shown in FIG. 1, in the downlink, mapping is performed on the transport channels and physical channels as described below. The broadcast channel (BCH) is mapped on the physical broadcast channel (PBCH). The multicast channel (MCH) is mapped on the physical multicast channel (PMCH). The paging channel (PCH) and downlink shared channel (DL-SCH) is mapped on the physical downlink shared channel (PDSCH). The physical downlink control channel (PDCCH), physical hybrid ARQ indicator channel (PHICH) and physical control format indicator channel (PCHICH) are used alone as a physical channel.

Meanwhile, in the uplink, mapping is performed on the transport channels and physical channels as described below. The uplink shared channel (UL-SCH) is mapped on the physical uplink shared channel (PUSCH). The random access channel (RACH) is mapped on the physical random access channel (PRACH). The physical uplink control channel (PUCCH) is used alone as a physical channel.

Further, in the downlink, mapping is performed on the logical channels and transport channels as described below. The paging control channel (PCCH) is mapped on the downlink shared channel (DL-SCH). The broadcast control channel (BCCH) is mapped on the broadcast channel (BCH) and downlink shared channel (DL-SCH). The common control channel (CCCH), dedicated control channel (DCCH) and dedicated traffic channel (DTCH) are mapped on the downlink shared channel (DL-SCH). The multicast control channel (MCCH) is mapped on the downlink shared channel (DL-SCH) and multicast channel (MCH). The multicast traffic channel (MTCH) is mapped on the downlink shared channel (DL-SCH) and multicast channel (MCH).

In addition, mapping of the multicast control channel (MCCH) and multicast traffic channel (MTCH) to the multicast channel (MCH) is performed in MBSFN transmission, while this mapping is performed on the downlink shared channel (DL-SCH) in SCPTM transmission.

Meanwhile, in the uplink, mapping is performed on the logical channels and transport channels as described below. The common control channel (CCCH), dedicated control channel (DCCH) and dedicated traffic channel (DTCH) are mapped on the uplink shared channel (UL-SCH). The random access channel (RACH) and logical channels are not mapped.

[Radio Frame Structure]

A frame structure in EUTRA will be described below. FIG. 3 illustrates a downlink frame structure, and FIG. 4 shows an uplink frame structure. A radio frame identified by a system frame number (SFN) is constructed in 10 ms. A subframe is constructed in 1 ms, and one radio frame contains 10 subframes.

A single subframe is divided into two slots. When a normal CP is used, a downlink slot is comprised of 7 OFDM symbols, and an uplink slot is comprised of 7 SC-FDMA (Single Carrier-Frequency Division Multiple Access) symbols. In addition, when a long CP (also referred to as "extended CP") is used, a downlink slot is comprised of 6 OFDM symbols, and an uplink slot is comprised of 6 SC-FDMA symbols.

Further, a single slot is divided into a plurality of slots in the frequency direction. A single physical resource block (PRB) is comprised of 12 subcarriers of 15 KHz that are a unit in the frequency direction. As the number of physical resource blocks (PRB), 6 to 110 blocks are supported corresponding to the system bandwidth. Downlink and uplink resource allocations are performed on a subframe basis in the time direction and on a physical resource block (PRB) basis in the frequency direction. In other words, two slots within a subframe are allocated using a single resource allocation signal.

A unit comprised of a subcarrier and OFDM symbol or a subcarrier and SC-FDMA symbol is referred to as a resource element. In resource mapping processing in the physical layer, a modulation symbol and the like is mapped to each resource element.

In the processing in the physical layer of the downlink transport channel is performed addition of 24-bit cyclic redundancy check (CRC) to the physical downlink shared channel (PDSCH), channel coding (transmission path coding), physical layer HARQ processing, channel interleaving, scrambling, modulation (QPSK, 16QAM, 64QAM), layer mapping, precoding, resource mapping, antenna mapping, etc. Meanwhile, in the processing in the physical layer of the uplink transport channel is performed addition of 24-bit CRC to the physical uplink shared channel (PUSCH), channel coding (transmission path coding), physical layer HARQ processing, scrambling, modulation (QPSK, 16QAM, 64QAM), resource mapping, antenna mapping, etc.

The physical downlink control channel (PDCCH), physical hybrid ARQ indicator channel (PHICH) and physical control format indicator channel (PCFICH) are placed within first three OFDM symbols. On the physical downlink control channel (PDCCH) are transmitted transport formats (specifying modulation scheme, coding scheme, transport block size, etc.) for the downlink shared channel (DL-SCH), and paging channel (PCH), resource allocation, and HARQ information. Further, on the physical downlink control channel (PDCCH) are transmitted transport formats (specifying modulation scheme, coding scheme, transport block size, etc.) for the uplink shared channel (UL-SCH), resource allocation, and HARQ information. Moreover, a plurality of physical downlink control channels (PDCCHs) is supported, and the mobile station apparatus monitors a set of physical downlink control channels (PDCCHs).

The physical downlink shared channel (PDSCH) assigned by the physical downlink control channel (PDCCH) is mapped to the same subframe as that of the physical downlink control channel (PDCCH). The physical uplink shared channel (PUSCH) assigned by the physical downlink control channel (PDCCH) is mapped to a subframe in a beforehand determined position. For example, when the downlink subframe number on the physical downlink control channel (PDCCH) is N, the physical uplink shared channel (PUSCH) is mapped to the N+4th uplink subframe.

Further, in uplink/downlink resource allocation by the physical downlink control channel (PDCCH), the mobile station apparatus is identified using 16-bit MAC layer identification information (MAC ID). In other words, this 16-bit MAC layer identification information (MAC ID) is included in the physical downlink control channel (PDCCH).

Furthermore, a downlink reference signal (downlink pilot channel) used for measurement of downlink conditions and demodulation of downlink data is placed in the first and second OFDM symbols, and third OFDM symbol from the last in each slot. Meanwhile, an uplink demodulation reference signal (demodulation pilot (DRS: Demodulation Reference Signal)) used for demodulation of the physical uplink shared channel (PUSCH) is transmitted in the fourth SC-FDMA symbol in each slot. Further, an uplink measurement reference signal (scheduling pilot (SRS: Sounding Reference Signal)) used for measurement of uplink conditions is transmitted in the first SC-FDMA symbol of a subframe. A demodulation reference signal of the uplink control channel (PUCCH) is defined for each format of the uplink control channel, and transmitted in the third, fourth and fifth SC-FDMA symbols in each slot, or the second and sixth SC-FDMA symbols in each slot.

Moreover, the physical broadcast channel (PBCH) and downlink synchronization signal are placed in a band corresponding to six center physical resource blocks in the system band. A physical downlink synchronization signal is transmitted in the sixth and seventh OFDM symbols in each slot of the first (subframe number #0) and fifth (subframe number #4) subframes. The physical broadcast channel (PBCH) is transmitted in the fourth and fifth OFDM symbols of the first slot (slot #0) and in the first and second OFDM symbols of the second slot (slot #1) in the first (subframe #0) subframe.

Further, the random access channel (RACH) is comprised of a bandwidth corresponding to six physical resource blocks in the frequency direction and a single subframe in the time direction, and is transmitted for the mobile station apparatus to make a request (request for uplink resources, request for uplink synchronization, request for downlink data transmission resume, request for handover, request for connection setting, request for reconnection, request for MBMS service, etc.) to the base station apparatus for various reasons.

The uplink control channel (PUCCH) is placed in opposite ends of the system band, and is comprised of a unit physical resource block. Frequency hopping is performed so that the opposite ends of the system band are used alternately between slots.

A communication system according to the Embodiments is comprised of a base station apparatus 100 and mobile station apparatuses 200.

[Base Station Apparatus]

FIG. 5 is a block diagram illustrating a schematic structure of a base station apparatus according to the Embodiments. As shown in FIG. 5, the base station apparatus 100 is comprised of a data control section 101, OFDM modulation section 102, radio section 103, scheduling section 104, channel estimation section 105, DFT-Spread-OFDM (DFT-S-OFDM) demodulation section 106, data extraction section 107, and higher layer 108. Further, the radio section 103, scheduling section 104, channel estimation section 105, DFT-Spread-OFDM (DFT-S-OFDM) demodulation section 106, data extraction section 107 and higher layer 108 constitute a receiving section, and the data control section 101, OFDM modulation section 102, radio section 103 and scheduling section 104 and higher layer 108 constitute a transmitting section.

The radio section 103, channel estimation section 105, DFT-Spread-OFDM (DFT-S-OFDM) demodulation section 106, and data extraction section 107 perform the processing of the uplink physical layer. The radio section 103, DFT-Spread-OFDM (DFT-S-OFDM) demodulation section 106, and data extraction section 107 perform the processing of the downlink physical layer.

The data control section 101 receives the transport channel and scheduling information from the scheduling section 104. The data control section 101 maps the transport channel and signal and channel generated in the physical layer on the physical channel based on the scheduling information input from the scheduling section 104. Each data mapped as described above is output to the OFDM modulation section 102.

The OFDM modulation section 102 performs OFDM signal processing such as coding, data modulation, serial/parallel transform of an input signal, IFFT (Inverse Fast Fourier Transform) processing, CP (Cyclic Prefix) insertion and filtering on the data input from the data control section 101, based on the scheduling information (including downlink physical resource block (PRB) allocation information (for example, physical resource block position information such as the frequency and time), modulation scheme and coding scheme (such as, for example, 16QAM, 2/3 coding rate, etc.) corresponding to each PRB, etc.) from the scheduling section 104, and thereby generates an OFDM signal to output to the radio section 103.

The radio section 103 up-converts the modulated data input from the OFDM modulation section 102 into a signal with a radio frequency to generate a radio signal, and transmits the radio signal to the mobile station apparatus 200 via an antenna (not shown). Further, the radio section 103 receives an uplink radio signal from the mobile station apparatus 200 via the antenna (not shown), down-coverts the radio signal into a baseband signal, and outputs reception data to the channel estimation section 105 and DFT-S-OFDM demodulation section 106.

The scheduling section 104 performs the processing of the medium access control (MAC) layer. The scheduling section 104 performs mapping of the logical channels and transport channels, downlink and uplink scheduling (HARQ processing, selection of transport format, etc.) and the like. In the downlink scheduling, the scheduling section 104 performs the processing for selecting a downlink transport format (transmission form) (physical resource block allocation, modulation scheme and coding scheme, etc.) to modulate each data, and retransmission control in HARQ, based on the uplink feedback information (downlink channel feedback information (channel state information (channel quality, the number of streams, pre-coding information, etc.), ACK/NACK feedback information in response to downlink data, etc.) received from the mobile station apparatus 200, the information of PRB usable in each mobile station apparatus, buffer status, the scheduling information input from the higher layer 108, etc. The scheduling information used in downlink scheduling is output to the data control section 101.

Further, in the uplink scheduling, the scheduling section 104 performs the processing for selecting an uplink transport format (transmission form) (physical resource block allocation, modulation scheme and coding scheme, etc.) to modulate each data, based on an estimation result of channel state (radio propagation path conditions) on uplink output from the channel estimation section 105, resource allocation request from the mobile station apparatus 200, information of PRB usable in each mobile station 200, the scheduling information input from the higher layer 108, etc. The scheduling information used in uplink scheduling is output to the data control section 101.

Furthermore, the scheduling section 104 maps the downlink logical channel input from the higher layer 108 on the transport channel to output to the data control section 101. Moreover, the scheduling section 104 performs processing on the control data and transport channel that is acquired on uplink and input from the data extraction section 107 when necessary, and then, maps the resultant on the uplink logical channel to output to the higher layer 108.

The channel estimation section 105 estimates uplink channel state from an uplink demodulation reference signal (DRS) to demodulate uplink data, and outputs the estimation result to the DFT-S-OFDM demodulation section 106. Further, in order to perform uplink scheduling, the channel estimation section 105 estimates uplink channel state from an uplink measurement reference signal (SRS: Sounding Reference Signal), and outputs the estimation result to the scheduling section 104. In addition, as an uplink communication scheme, a single-carrier scheme is assumed such as DFT-S-OFDM, etc, but a multicarrier scheme may be used such as an OFDM scheme.

The DFT-S-OFDM demodulation section 106 performs DFT-S-OFDM signal processing such as DFT transform, subcarrier mapping, IFFT transform, filtering, etc. on modulated data input from the radio section 103 based on the uplink channel state estimation result input from the channel estimation section 105, and performs demodulation processing on the resultant to output to the data extraction section 107.

The data extraction section 107 checks the data input from the DFT-S-OFDM demodulation section 106 for accuracy or error, and outputs the checking result (acknowledge signal ACK/negative acknowledge signal NACK) to the scheduling section 104. Further, the data extraction section 107 divides the data input from the DFT-S-OFDM demodulation section 106 into the transport channel and control data of the physical layer to output to the scheduling section 104. The divided control data includes the feedback information on uplink (downlink channel feedback report CFR, and ACK/NACK feedback information in response to the downlink data) and the like.

The higher layer 108 performs the processing in the packet data convergence protocol (PDCP) layer, radio link control (RLC) layer, and radio resource control (RRC) layer. The higher layer 108 has a radio resource control section 109 (also referred to as a control section). The radio resource control section 109 performs management of various kinds of setting information, management of system information, paging control, management of communication conditions of each mobile station apparatus, moving management such as handover, management of buffer status for each mobile station apparatus, management of connection settings of unicast and multicast bearers, management of mobile station identities (UEID), etc.

[Mobile Station Apparatus]

FIG. 6 is a block diagram illustrating a schematic structure of the mobile station apparatus according to the Embodiments. As shown in FIG. 6, the mobile station apparatus 200 is comprised of a data control section 201, DFT-S-OFDM modulation section 202, radio section 203, scheduling section 204, channel estimation section 205, OFDM demodulation section 206, data extraction section 207, and higher layer 208. Further, the data control section 201, DFT-S-OFDM modulation section 202, radio section 203, scheduling section 204 and higher layer 208 constitute a transmitting section, and the radio section 203, scheduling section 204, channel estimation section 205, OFDM demodulation section 206, data extraction section 207 and higher layer 208 constitute a receiving section. Further, the scheduling section 204 constitutes a selecting section.

The data control section 201, DFT-S-OFDM modulation section 202 and radio section 203 perform the processing of the uplink physical layer. The radio section 203, channel estimation section 205, OFDM demodulation section 206 and data extraction section 207 perform the processing of the downlink physical layer.

The data control section 201 receives the transport channel and scheduling information from the scheduling section 204. The data control section 201 maps the transport channel and signal and channel generated in the physical layer on the physical channel based on the scheduling information input from the scheduling section 204. Each data mapped as described above is output to the DFT-S-OFDM modulation section 202.

The DFT-S-OFDM modulation section 202 performs DFT-S-OFDM signal processing such as data modulation, DFT (Discrete Fourier Transform) processing, subcarrier mapping, IFFT (Inverse Fast Fourier Transform) processing, CP insertion, filtering, etc. on the data input from the data control section 201, and thereby generates a DFT-S-OFDM signal to output to the radio section 203.

In addition, as an uplink communication scheme, a single-carrier scheme is assumed such as DFT-S-OFDM, etc, but may be substituted by a multicarrier scheme such as an OFDM scheme to be used.

The radio section 203 up-converts the modulated data input from the DFT-S-OFDM modulation section 202 into a signal with a radio frequency to generate a radio signal, and transmits the radio signal to the base station apparatus 100 via an antenna (not shown).

Further, the radio section 203 receives a radio signal modulated with the downlink data from the base station apparatus 100 via the antenna (not shown), down-coverts the radio signal into a baseband signal, and outputs reception data to the channel estimation section 205 and OFDM demodulation section 206.

The scheduling section 204 performs the processing of the medium access control (MAC) layer. The scheduling section 204 performs mapping of the logical channels and transport channels and downlink and uplink scheduling (HARQ processing, selection of transport format, etc.). In the downlink scheduling, the scheduling section 204 performs reception control of the transport channel, physical signal and physical channel and HARQ retransmission control based on the scheduling information (transport format and HARQ retransmission information) and the like from the base station apparatus 100 and higher layer 208.

In the uplink scheduling, the scheduling section 204 performs scheduling processing for mapping the uplink logical channel input from the higher layer 208 on the transport channel based on the uplink buffer status input from the higher layer 208, uplink scheduling information (transport format, HARQ retransmission information, etc.) from the base station apparatus 100 input from the data extraction section 207, and the scheduling information input from the higher layer 208. In addition, for the uplink transport format, the information notified from the base station apparatus 100 is used. These kinds of scheduling information are output to the data control section 201.

Further, the scheduling section 204 maps the uplink logical channel input from the higher layer 208 on the transport channel to output to the data control section 201. Furthermore, the scheduling section 204 outputs to the data control section 201 also the downlink channel feedback report CFR (channel state information) input from the channel estimation section 205, and CRC checking result input from the data extraction section 207. Moreover, the scheduling section 204 performs processing on the control data and transport channel that is acquired on downlink and input from the data extraction section 207 when necessary, and then, maps the resultant on the downlink logical channel to output to the higher layer 208.

The channel estimation section 205 estimates downlink channel state from a downlink reference signal (RS) to demodulate downlink data, and outputs the estimation result to the OFDM demodulation section 206. Further, in order to notify the base station apparatus 100 of the estimation result of the downlink channel state (radio propagation path conditions), the channel estimation section 205 estimates the downlink channel state from the downlink reference signal (RS), and converts the estimation result into the feedback information (channel quality information) about the downlink channel state to output to the scheduling section 204.

The OFDM demodulation section 206 performs OFDM demodulation processing on the modulated data input from the radio section 203 based on the downlink channel state estimation result input from the channel estimation section 205, and outputs the resultant to the data extraction section 207.

The data extraction section 207 performs CRC on the data input from the OFDM demodulation section 206 to check for accuracy or error, and outputs the checking result (ACK/NACK feedback information) to the scheduling section 204. Further, the data extraction section 207 divides the data input from the OFDM demodulation section 206 into the transport channel and control data of the physical layer to output to the scheduling section 204. The divided control data includes the scheduling information such as downlink or uplink resource allocation, uplink HARQ control information, etc. At this point, the data extraction section 207 performs decoding processing on a search space (also referred to as a search area) of a physical downlink control signal (PDCCH), and extracts downlink or uplink resource allocation to the mobile station apparatus 200, etc.

The higher layer 208 performs the processing in the packet data convergence protocol (PDCP) layer, radio link control (RLC) layer, and radio resource control (RRC) layer. The higher layer 208 has a radio resource control section 209 (also referred to as a control section). The radio resource control section 209 performs management of various kinds of setting information, management of system information, paging control, management of communication conditions of the mobile station apparatus 200, moving management such as handover, management of buffer status, management of connection settings of unicast and multicast bearers and management of mobile station identity (UEID).

Embodiment 1

Described subsequently is Embodiment 1 of the invention in the communication system using the base station apparatus 100 and mobile station apparatus 200. The mobile station apparatus determines whether to transmit the channel feedback report CFR using persistently allocated uplink resources (physical uplink shared channel (PUSCH)) or using temporarily (one-shot) allocated uplink resources (physical uplink shared channel (PUSCH)), based on information included in a physical downlink control signal (PDCCH) for performing uplink resource allocation.

The mobile station apparatus transmits the uplink data (uplink shared channel: UL-SCH) and the channel feedback report CFR on the persistently allocated physical uplink shared channel (PUSCH) when the physical downlink control signal (PDCCH) for performing persistent uplink resource allocation includes the information for requesting the channel feedback report CFR, while transmitting the uplink data on the persistently allocated physical uplink shared channel (PUSCH) when the physical downlink control signal (PDCCH) does not include the information for requesting the channel feedback report CFR.

The mobile station apparatus judges whether the control signal is a control signal to the mobile station apparatus by determining whether MAC ID included in the physical downlink control signal (PDCCH) includes a cell-radio network temporary identity (C-RNTI) that is the mobile station identity of the mobile station apparatus. The MAC ID may be identified as CRC of the physical downlink control signal (PDCCH), or may be identified by scramble code of the physical downlink control signal (PDCCH). The physical downlink control signal (PDCCH) is identified as an uplink transmission grant signal or downlink resource allocation by its bit size and/or flag. The uplink transmission grant signal includes a channel feedback report request.

Described further is a method of including a signal for requesting to transmit only the channel feedback report CFR (that may include ACK/NACK in response to the downlink data, or the like) without including the uplink data (UL-SCH) in the physical downlink control signal (PDCCH). When a part of transport format is reserved in advance and some particular information sequence is included in the physical downlink control signal (PDCCH), it is indicated to request to transmit only the channel feedback report CFR (for example, a value of five-bit MCS is "11111", etc.) Alternately, by including a one-bit signal simply in the physical downlink control signal (PDCCH), a request is instructed to transmit only the channel feedback report CFR. This is called the channel feedback report dedicated transmission request.

Described next is a specific physical downlink control signal (PDCCH) used for activating persistent scheduling. The base station apparatus assigns to the mobile station apparatus, by RRC signaling, a cell-radio network temporary identity (C-RNTI (also referred to as a special C-RNTI)) that is the mobile station identity indicative of for activation of persistent scheduling, or a cell-radio network temporary identity (C-RNTI (also referred to as a special C-RNTI)) that is the mobile station identity indicative of for activation of periodic channel feedback report, separately from a cell-radio network temporary identity (C-RNTI) used for normal dynamic scheduling. Alternately, a specific scramble code for activation of persistent scheduling (or periodic channel feedback report) is applied to the physical downlink control signal (PDCCH). The other information included in the physical downlink control signal (PDCCH) is the same both for persistent scheduling (or periodic channel feedback) and for dynamic scheduling.

Namely, included are the transport format, resource allocation (PRB allocation), HARQ information, channel feedback report request, etc. In other words, by introducing a mobile station identity indicative of for activation of persistent scheduling (or periodic channel feedback), it is possible to use a normal physical downlink control signal (PDCCH) for the persistent scheduling (or periodic channel feedback). Further, when the persistent scheduling and periodic channel feedback are concurrently set, the same cell-radio network temporary identity (C-RNTI) is used. By this means, it is possible to share both mechanisms of the persistent scheduling and periodic channel feedback. In addition, for the persistent scheduling and periodic channel feedback, different cell-radio network temporary identities (C-RNTIs) can be assigned.

Described herein is a decoding method of the physical downlink control signal (PDCCH). The physical downlink control signal (PDCCH) is comprised of a set of a plurality of resource element groups, a plurality of corresponding resource element groups exists, there is a plurality of numbers of resource elements included in the physical downlink control signal (PDCCH), and the coding rate is variable. The mobile station apparatus decodes all the candidates for placement of the physical downlink control signal (PDCCH), and by the fact that the mobile station identification information of the apparatus is included and that CRC succeeds, specifies and decodes the physical downlink control signal (PDCCH) to the apparatus. This processing is called the blind decoding. In order to reduce the number of times of the blind decoding, the search space (groups of resource elements to decode) of the physical downlink control signal (PDCCH) is limited by an output of hash function based on the cell-radio network temporary identity (C-RNTI) that is the mobile station identity.

However, since the search space of the physical downlink control signal (PDCCH) is increased by newly adding the cell-radio network temporary identity (C-RNTI) for persistent scheduling and/or periodic channel feedback as described above, the cell-radio network temporary identity (C-RNTI) for dynamic scheduling i.e. the cell-radio network temporary identity (C-RNTI) that is always assigned to the mobile station apparatus under communication is always used in input of hash function.

When the mobile station apparatus holds a plurality of cell-radio network temporary identities (herein, a cell-radio network temporary identity (C-RNTI) for persistent scheduling and/or cell-radio network temporary identity (C-RNTI) for periodic channel feedback and/or cell-radio network temporary identity (C-RNTI) for dynamic scheduling, the mobile station apparatus searches for a plurality of mobile station identities in the search space of the physical downlink control signal (PDCCH) corresponding to a single mobile station identity (herein, the cell-radio network temporary identity (C-RNTI) for dynamic scheduling). When the base station apparatus assigns a plurality of mobile station identities to the mobile station apparatus, the base station apparatus places physical downlink control signals (PDCCH) including respective mobile station identities in the search space of the physical downlink control signal (PDCCH) corresponding to a single mobile station identity. By this means, the mobile station apparatus searches for another cell-radio network temporary identity (C-RNTI) for persistent scheduling or periodic channel feedback, while maintaining the search space (also referred to as a search area) of the physical downlink control signal (PDCCH), and the processing is reduced.

As another method, to limit the search space of physical downlink control signal (PDCCH), the mobile station apparatus uses a common search space in which the physical downlink control signal (PDCCH) is placed to be used for scheduling of broadcast information, random access response, etc. The common search space is a search space for all the mobile station apparatuses to need to search for the physical downlink control signal (PDCCH), separately from the search space limited by the cell-radio network temporary identity (C-RNTI) for dynamic scheduling. When the mobile station apparatus searches for another mobile station identity except the cell-radio network temporary identity (C-RNTI) for dynamic scheduling, the mobile station apparatus searches the common search space for the cell-radio network temporary identity (C-RNTI) for persistent scheduling and/or cell-radio network temporary identity (C-RNTI) for periodic channel feedback. The base station apparatus places the physical downlink control signal (PDCCH) including the cell-radio network temporary identity (C-RNTI) for persistent scheduling and/or cell-radio network temporary identity (C-RNTI) for periodic channel feedback in the common search space.

By this means, the mobile station apparatus searches for another cell-radio network temporary identity (C-RNTI) for persistent scheduling or periodic channel feedback, while maintaining the search space (also referred to as a search area) of the physical downlink control signal (PDCCH), and the processing is reduced.

FIG. 7 is a diagram showing an example of operations of the mobile station apparatus corresponding to types of physical downlink control signals (PDCCH). The operations as shown in FIG. 7 are controlled in cooperation between the physical layer and MAC layer of the mobile station apparatus. When the dynamic physical downlink control signal (PDCCH) is set for a channel feedback report dedicated transmission request, the mobile station apparatus transmits only the channel feedback report on the designated PUSCH aperiodically in one shot (in a single transmission, or a single HARQ process).

When the dynamic physical downlink control signal (PDCCH) is set for a channel feedback report request, the mobile station apparatus transmits the uplink data (UL-SCH) and the channel feedback report on the designated PUSCH aperiodically in one shot. When the dynamic physical downlink control signal (PDCCH) is set for neither a channel feedback report request nor a channel feedback report dedicated request, the mobile station apparatus transmits the uplink data (UL-SCH) on the designated PUSCH aperiodically in one shot.

When the physical downlink control signal (PDCCH) for persistent (or periodic channel feedback) is set for a channel feedback report dedicated transmission request, the mobile station apparatus transmits only the channel feedback report on the designated PUSCH periodically and persistently. The feedback period in this case is a transmission period of periodic channel feedback reports set by RRC signaling.

When the physical downlink control signal (PDCCH) for persistent (or periodic channel feedback) is set for a channel feedback report request, the mobile station apparatus transmits the uplink data (UL-SCH) and the channel feedback report on the designated PUSCH periodically and persistently. In this case, the persistent scheduling of uplink data and periodic channel feedback report are concurrently set. The feedback period in this case is a period of persistent scheduling of uplink data set by RRC signaling.

When the physical downlink control signal (PDCCH) for persistent (or periodic channel feedback) is set for neither a channel feedback report request nor a channel feedback report dedicated request, the mobile station apparatus transmits the uplink data (UL-SCH) on the designated PUSCH periodically and persistently. The feedback period in this case is a period of persistent scheduling of uplink data set by RRC signaling.

Described next is a method of halting (deactivating) the persistent scheduling of uplink data and periodic channel feedback report. To halt (deactivate) the persistent scheduling of uplink data and periodic channel feedback report, an uplink grant of "no uplink resource allocation" is transmitted in the physical downlink control signal (PDCCH). Herein, "no uplink resource allocation" is identified by the resource allocation information included in the uplink grant being a beforehand determined particular value.

When the physical downlink control signal (PDCCH) for persistent (or periodic channel feedback) is set for "no uplink resource allocation" and a channel feedback report dedicated transmission request, the mobile station apparatus halts only the periodic channel feedback report.

When the physical downlink control signal (PDCCH) for persistent (or periodic channel feedback) is set for "no uplink resource allocation" and a channel feedback report request, the mobile station apparatus halts the persistent scheduling of uplink data being used or the periodic channel feedback report. When both of them are used, the mobile station apparatus concurrently halts the persistent scheduling of uplink data and the periodic channel feedback report.

When the physical downlink control signal (PDCCH) for persistent (or periodic channel feedback) is set for "no uplink resource allocation" while being set for neither a channel feedback report request nor a channel feedback report dedicated request, the mobile station apparatus halts only the persistent scheduling of uplink data.

FIG. 8 is a diagram showing another example of operations of the mobile station apparatus corresponding to types of physical downlink control signals (PDCCH). When the dynamic physical downlink control signal (PDCCH) is not set for a channel feedback report request, while being set for a channel feedback report dedicated transmission request, the mobile station apparatus transmits only the channel feedback report on the designated PUSCH periodically and persistently. The feedback period in this case is a transmission period of periodic channel feedback reports set by RRC signaling. By this means, without using the persistent physical downlink control signal (PDCCH), it is possible to activate the periodic channel feedback report.

When the dynamic physical downlink control signal (PDCCH) is set for a channel feedback report request, while being not set for a channel feedback report dedicated transmission request, the mobile station apparatus transmits the uplink data (UL-SCH) and the channel feedback report on the designated PUSCH aperiodically in one shot. When the dynamic physical downlink control signal (PDCCH) is set for both of a channel feedback report request and a channel feedback report dedicated request, the mobile station apparatus transmits only the channel feedback report on the designated PUSCH aperiodically in one shot.

When the dynamic physical downlink control signal (PDCCH) is set for neither a channel feedback report request nor a channel feedback report dedicated request, the mobile station apparatus transmits only the uplink data (UL-SCH) on the designated PUSCH aperiodically in one shot.

When the physical downlink control signal (PDCCH) for persistent (or periodic channel feedback) is not set for a channel feedback report request, while being set for a channel feedback report dedicated transmission request, the physical downlink control signal (PDCCH) is used for other uses.

When the physical downlink control signal (PDCCH) for persistent (or periodic channel feedback) is set for a channel feedback report request, while being not set for a channel feedback report dedicated transmission request, the mobile station apparatus transmits the uplink data (UL-SCH) and channel feedback report on the designated PUSCH periodically and persistently. In this case, the persistent scheduling of uplink data (UL-SCH) and periodic channel feedback report are concurrently set. The feedback period in this case is a period of persistent scheduling of uplink data (UL-SCH) set by RRC signaling.

By this means, it is possible to enable the channel feedback report concurrently with the uplink data (UL-SCH), and resources and consumed power can be used effectively. As another method, to the feedback period in this case is applied concurrently the period of persistent scheduling of uplink data (UL-SCH) and the transmission period of periodic channel feedback reports set by RRC signaling. In this way, by a single physical downlink control signal (PDCCH), it is possible to concurrently activate the period of persistent scheduling of uplink data (UL-SCH) and the periodic channel feedback report.

When the physical downlink control signal (PDCCH) for persistent (or periodic channel feedback) is set for both of a channel feedback report request and a channel feedback report dedicated transmission request, the mobile station apparatus transmits only the channel feedback report on the designated PUSCH periodically and persistently. The feedback period in this case is a period of periodic channel feedback reports set by RRC signaling.

When the physical downlink control signal (PDCCH) for persistent (or periodic channel feedback) is set for neither a channel feedback report request nor a channel feedback report dedicated request, the mobile station apparatus transmits the uplink data (UL-SCH) on the designated PUSCH periodically and persistently. The feedback period in this case is a period of persistent scheduling of uplink data set by RRC signaling.

Described next is a method of halting (deactivating) the persistent scheduling of uplink data and periodic channel feedback report. To halt (deactivate) the persistent scheduling of uplink data and periodic channel feedback report, an uplink grant of "no uplink resource allocation" is transmitted in the physical downlink control signal (PDCCH). Herein, "no uplink resource allocation" is identified by the resource allocation information included in the uplink grant being a beforehand determined particular value.

When the dynamic physical downlink control signal (PDCCH) is not set for a channel feedback report request, while being set for "no uplink resource allocation" and a channel feedback report dedicated transmission request, the mobile station apparatus halts only the periodic channel feedback report.

When the physical downlink control signal (PDCCH) for persistent (or periodic channel feedback) is not set for a channel feedback report request, while being set for "no uplink resource allocation" and a channel feedback report dedicated transmission request, the mobile station apparatus halts the persistent scheduling of uplink data being used or the periodic channel feedback report. When both of them are used, the mobile station apparatus concurrently halts the persistent scheduling of uplink data and the periodic channel feedback report.

When the physical downlink control signal (PDCCH) for persistent (or periodic channel feedback) is set for "no uplink resource allocation" and a channel feedback report request, while being not set for a channel feedback report dedicated transmission request, the mobile station apparatus halts the persistent scheduling of uplink data being used or the periodic channel feedback report. When both of them are used, the mobile station apparatus concurrently halts the persistent scheduling of uplink data and the periodic channel feedback report.

When the physical downlink control signal (PDCCH) for persistent (or periodic channel feedback) is set for "no uplink resource allocation", a channel feedback report request and a channel feedback report dedicated transmission request, the mobile station apparatus halts only the periodic channel feedback report.

When the physical downlink control signal (PDCCH) for persistent (or periodic channel feedback) is set for "no uplink resource allocation", while being set for neither a channel feedback report request nor a channel feedback report dedicated request, the mobile station apparatus halts only the persistent scheduling of uplink data.

FIG. 9 is a diagram showing still another example of operations of the mobile station apparatus corresponding to types of physical downlink control signals (PDCCH). In this example, different cell-radio network temporary identities (C-RNTIs) are assigned for persistent scheduling and periodic channel feedback. The operations as shown in FIG. 9 are controlled in cooperation between the physical layer and MAC layer of the mobile station apparatus. When the dynamic physical downlink control signal (PDCCH) is set for a channel feedback report dedicated transmission request, the mobile station apparatus transmits only the channel feedback report on the designated PUSCH aperiodically in one shot (in a single transmission, or a single HARQ process).

When the dynamic physical downlink control signal (PDCCH) is set for a channel feedback report request, the mobile station apparatus transmits the uplink data (UL-SCH) and the channel feedback report on the designated PUSCH aperiodically in one shot. When the dynamic physical downlink control signal (PDCCH) is set for neither a channel feedback report request nor a channel feedback report dedicated request, the mobile station apparatus transmits the uplink data (UL-SCH) on the designated PUSCH aperiodically in one shot.

When the persistent physical downlink control signal (PDCCH) is set for a channel feedback report request, the mobile station apparatus transmits the uplink data (UL-SCH) and the channel feedback report on the designated PUSCH periodically and persistently. In this case, the persistent scheduling of uplink data and periodic channel feedback report are concurrently set. The feedback period in this case is a period of persistent scheduling of uplink data set by RRC signaling.

When the persistent physical downlink control signal (PDCCH) is set for neither a channel feedback report request nor a channel feedback report dedicated request, the mobile station apparatus transmits the uplink data (UL-SCH) on the designated PUSCH periodically and persistently. The feedback period in this case is a period of persistent scheduling of uplink data set by RRC signaling.

When the mobile station apparatus receives the physical downlink control signal (PDCCH) for periodic channel feedback, the mobile station apparatus transmits only the channel feedback report on the designated PUSCH periodically and persistently without including the uplink data (UL-SCH). The feedback period in this case is a period of periodic channel feedback reports set by RRC signaling.

Described next is a method of halting (deactivating) the persistent scheduling of uplink data and periodic channel feedback report. To halt (deactivate) the persistent scheduling of uplink data and periodic channel feedback report, an uplink grant of "no uplink resource allocation" is transmitted in the physical downlink control signal (PDCCH). Herein, "no uplink resource allocation" is identified by the resource allocation information included in the uplink grant being a beforehand determined particular value.

When the persistent physical downlink control signal (PDCCH) is set for "no uplink resource allocation" and a channel feedback report request, the mobile station apparatus halts the persistent scheduling of uplink data being used or the periodic channel feedback report. When both of them are used, the mobile station apparatus concurrently halts the persistent scheduling of uplink data and the periodic channel feedback report.

When the persistent physical downlink control signal (PDCCH) is set for "no uplink resource allocation", while being set for neither a channel feedback report request nor a channel feedback report dedicated request, the mobile station apparatus halts only the persistent scheduling of uplink data.

When the physical downlink control signal (PDCCH) for periodic channel feedback is set for "no uplink resource allocation", the mobile station apparatus halts the periodic channel feedback report.

In Embodiment 1, for the timing of the PUSCH of the periodic channel feedback report and uplink persistent scheduling, it is the premise to use the PUSCH in a subframe of timing in response to an uplink transmission grant signal. By this means, it is possible to perform dynamically fast resource allocation.

Meanwhile, a subframe offset may be set by RRC signaling. There are set a subframe offset of the periodic channel feedback report and a subframe offset of the persistent scheduling of uplink data. In this case, the timing of the PUSCH of the periodic channel feedback report and uplink persistent scheduling is designated by RRC signaling. By this means, it is possible to perform more robust resource allocation.

FIG. 10 is a diagram showing an example of transmission/reception of signals between the mobile station apparatus and base station apparatus corresponding to the dynamic physical downlink control signals (PDCCH) as shown in FIG. 7. The base station apparatus transmits a dynamic uplink grant to the mobile station apparatus in the physical downlink control signal (PDCCH) in D-subframe#2. This uplink grant includes a channel feedback report dedicated request. The mobile station apparatus receiving the channel feedback report dedicated request in D-subframe#2 performs uplink transmission on the PUSCH including only the channel feedback report CFR in U-subframe#6.

The base station apparatus transmits a dynamic uplink grant to the mobile station apparatus in the physical downlink control signal (PDCCH) in D-subframe#8. This uplink grant includes a channel feedback report request. The mobile station apparatus receiving the channel feedback report request in D-subframe#8 performs uplink transmission on the PUSCH including the channel feedback report CFR and uplink data (UL-SCH) in U-subframe#12.

The base station apparatus transmits a dynamic uplink grant to the mobile station apparatus in the physical downlink control signal (PDCCH) in D-subframe#14. This uplink grant includes neither a channel feedback report request nor a channel feedback report dedicated request. The mobile station apparatus receiving the uplink grant in D-subframe#14 performs uplink transmission on the PUSCH that does not include the channel feedback report CFR in U-subframe#18.

Figure 11:
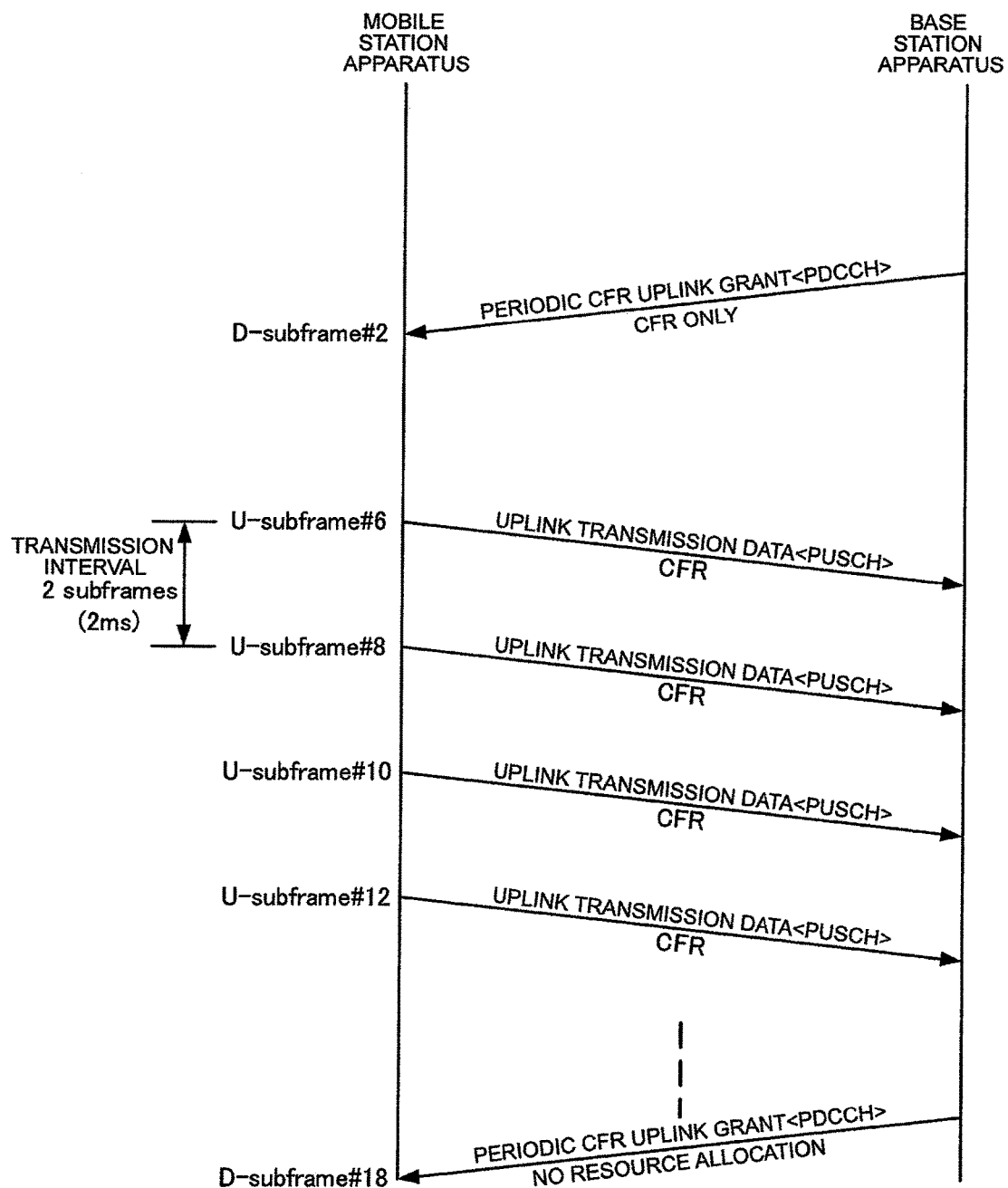
FIG. 11 is a diagram showing an example of transmission/reception of signals between the mobile station apparatus and base station apparatus corresponding to the case where a channel feedback report dedicated request is designated by a persistent (or periodic channel feedback) physical downlink control signal (PDCCH) shown in FIG. 7.

FIG. 11 is a diagram showing an example of transmission/reception of signals between the mobile station apparatus and base station apparatus corresponding to the case where a channel feedback report dedicated request is designated by a persistent (or periodic channel feedback) physical downlink control signal (PDCCH) shown in FIG. 7. The mobile station apparatus and base station apparatus beforehand make settings for the periodic channel feedback report by transmitting and receiving RRC signaling. The settings include a cell-radio network temporary identity (C-RNTI) that is the mobile station identity indicative of for activation of periodic channel feedback report, reporting formats of periodic feedback reports (wide-band report, mobile-station selection sub-band report, base-station selection sub-band report, etc.), feedback period (transmission interval) and the like.

The base station apparatus transmits an uplink grant for periodic channel feedback to the mobile station apparatus in the physical downlink control signal (PDCCH) in D-subframe#2. This uplink grant includes a channel feedback report dedicated request. The mobile station apparatus receiving the channel feedback report dedicated request in D-subframe#2 performs uplink transmission on the PUSCH including only the channel feedback report CFR at 2-subframe intervals (assuming that the transmission interval is set at two subframes (2 ms) by RRC signaling) from U-subframe#6.

The base station apparatus transmits an uplink grant for periodic channel feedback of "no uplink resource allocation" in the physical downlink control signal (PDCCH) in D-subframe#18. Herein, "no uplink resource allocation" is identified by the resource allocation information included in the uplink grant being a beforehand determined particular value. The mobile station apparatus receiving the uplink grant for periodic channel feedback of "no uplink resource allocation" in D-subframe#18 halts periodic channel feedback.

Figure 12:
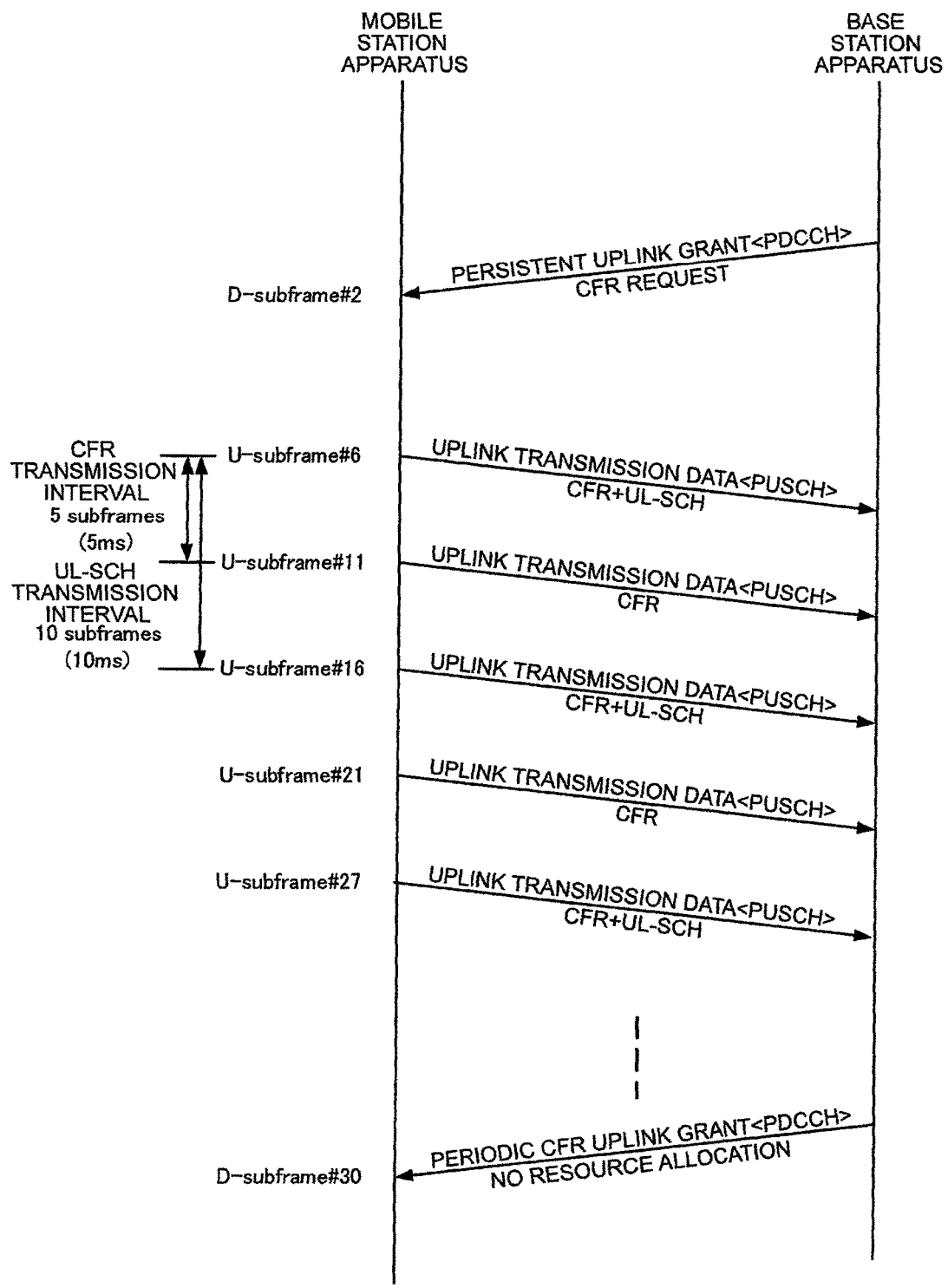
FIG. 12 is a diagram showing an example of transmission/reception of signals between the mobile station apparatus and base station apparatus corresponding to the case where a channel feedback report request is designated by a persistent (or periodic channel feedback) physical downlink control signal (PDCCH) shown in FIG. 7.

FIG. 12 is a diagram showing an example of transmission/reception of signals between the mobile station apparatus and base station apparatus corresponding to the case where a channel feedback report request is designated by a persistent (or periodic channel feedback) physical downlink control signal (PDCCH) shown in FIG. 7. The mobile station apparatus and base station apparatus beforehand make settings for the periodic channel feedback report by transmitting and receiving RRC signaling. The settings include reporting formats of periodic feedback reports (wide-band report, mobile-station selection sub-band report, base-station selection sub-band report, etc.), feedback period (transmission interval) and the like.

Further, the mobile station apparatus and base station apparatus beforehand make settings for persistent scheduling by transmitting and receiving RRC signaling. The settings include a cell-radio network temporary identity (C-RNTI) that is the mobile station identity indicative of for activation of persistent scheduling, period (transmission interval) and the like. In the following description, it is assumed that the channel feedback report period is set at five subframes (5 ms) and that the persistent scheduling period is set at ten subframes (10 ms) by RRC signaling.

The base station apparatus transmits a persistent uplink grant to the mobile station apparatus in the physical downlink control signal (PDCCH) in D-subframe#2. This uplink grant includes a channel feedback report request. The mobile station apparatus receiving the channel feedback report request in D-subframe#2 performs uplink transmission on the PUSCH including only the channel feedback report CFR at 10-subframe intervals from U-subframe#11, while performing uplink transmission on the PUSCH including the channel feedback report CFR and uplink data (UL-SCH) at 10-subframe intervals from U-subframe#6.

In other words, the mobile station apparatus transmits concurrently the channel feedback report CFR and uplink data on the PUSCH in subframes where a channel feedback report transmission subframe coincides with a persistent scheduling transmission subframe. The base station apparatus transmits a persistent uplink grant of "no uplink resource allocation" in the physical downlink control signal (PDCCH) in D-subframe#30. Herein, "no uplink resource allocation" is identified by the resource allocation information included in the uplink grant being a beforehand determined particular value.

The mobile station apparatus receiving the persistent uplink grant of "no uplink resource allocation" in D-subframe#30 halts transmission of periodic channel feedback and/or uplink data (UL-SCH) with persistent resources. Which is halted is included in the persistent uplink grant, and is determined by a combination of the channel feedback report request, channel feedback report dedicated request and "no uplink resource allocation".

Figure 13:
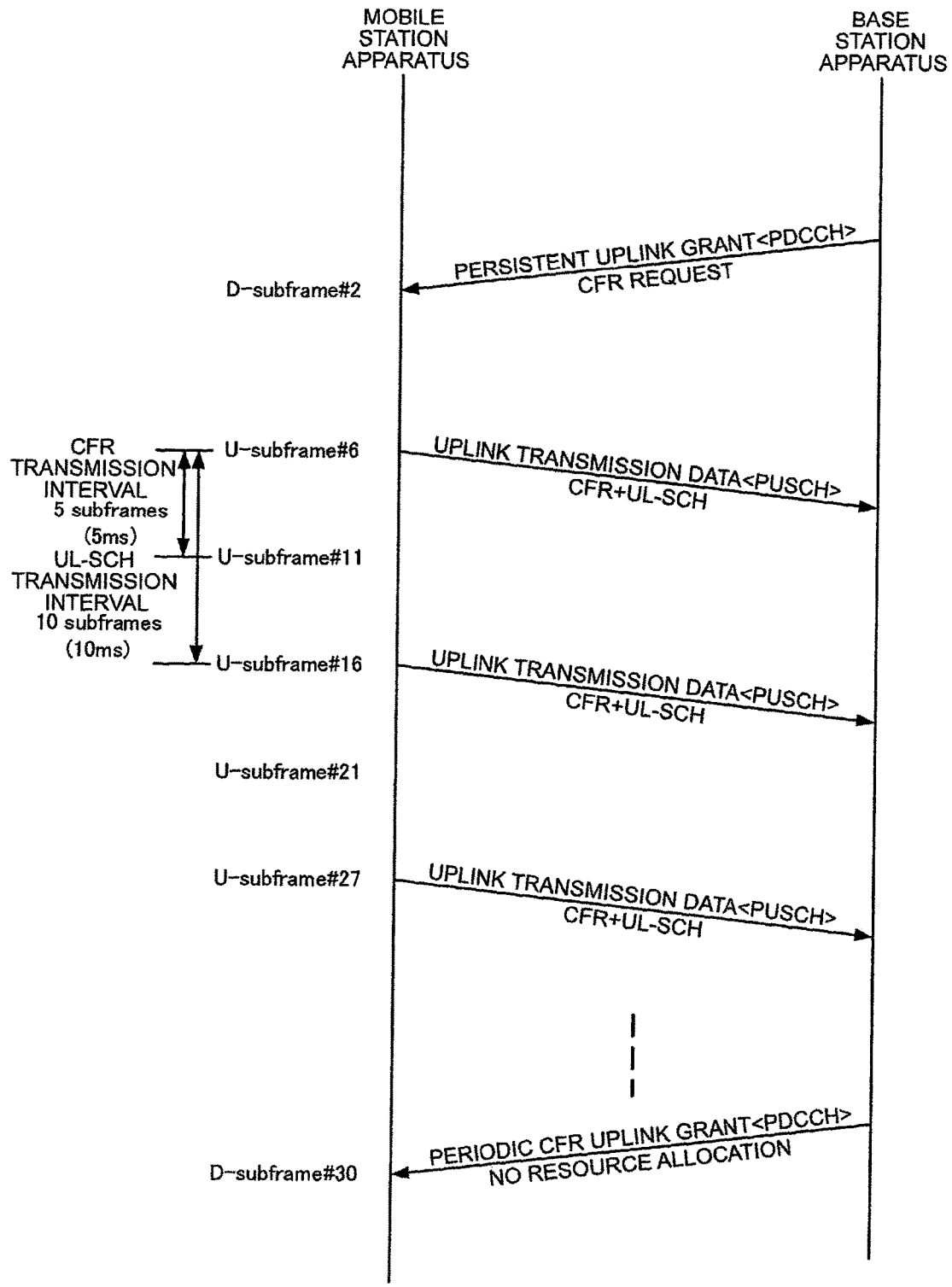
FIG. 13 is a diagram showing another example of transmission/reception of signals between the mobile station apparatus and base station apparatus corresponding to the case where a channel feedback report request is designated by a persistent (or periodic channel feedback) physical downlink control signal (PDCCH) shown in FIG. 7.

FIG. 13 is a diagram showing another example of transmission/reception of signals between the mobile station apparatus and base station apparatus corresponding to the case where a channel feedback report request is designated by a persistent (or periodic channel feedback) physical downlink control signal (PDCCH) shown in FIG. 7. The mobile station apparatus and base station apparatus beforehand make settings for the periodic channel feedback report by transmitting and receiving RRC signaling. The settings include reporting formats of periodic feedback reports (wide-band report, mobile-station selection sub-band report, base-station selection sub-band report, etc.), feedback period (transmission interval) and the like.

Further, the mobile station apparatus and base station apparatus beforehand make settings for persistent scheduling by transmitting and receiving RRC signaling. The settings include a cell-radio network temporary identity (C-RNTI) that is the mobile station identity indicative of for activation of persistent scheduling, period (transmission interval) and the like. In the following description, it is assumed that the channel feedback report period is set at five subframes (5 ms) and that the persistent scheduling period is set at ten subframes (10 ms) by RRC signaling.

The base station apparatus transmits a persistent uplink grant to the mobile station apparatus in the physical downlink control signal (PDCCH) in D-subframe#2. This uplink grant includes a channel feedback report request. The mobile station apparatus receiving the channel feedback report request in D-subframe#2 performs uplink transmission on the PUSCH including the channel feedback report CFR and uplink data (UL-SCH) at 10-subframe intervals from U-subframe#6.

In other words, the channel feedback report CFR is transmitted only in persistent scheduling transmission subframes. The base station apparatus transmits a periodic channel feedback uplink grant of "no uplink resource allocation" in the physical downlink control signal (PDCCH) in D-subframe#30. Herein, "no uplink resource allocation" is identified by the resource allocation information included in the uplink grant being a beforehand determined particular value.

The mobile station apparatus receiving the periodic channel feedback uplink grant of "no uplink resource allocation" in D-subframe#30 halts transmission of periodic channel feedback and/or uplink data (UL-SCH) with persistent resources. Which is halted is included in the persistent uplink grant, and is determined by a combination of the channel feedback report request, channel feedback report dedicated request and "no uplink resource allocation".

Figure 14:
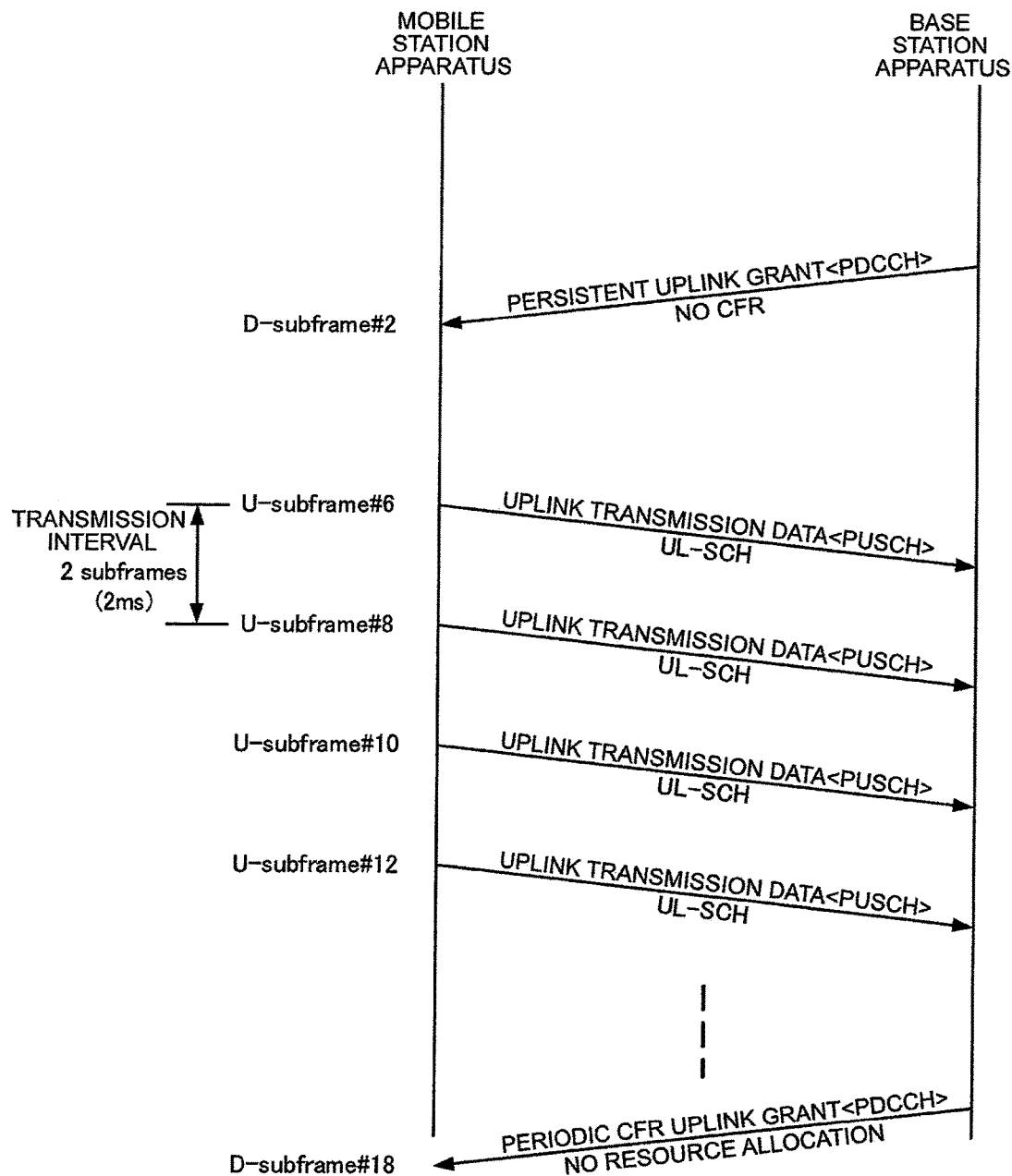
FIG. 14 is a diagram showing an example of transmission/reception of signals between the mobile station apparatus and base station apparatus corresponding to the case where a channel feedback report dedicated request is designated by a persistent (or periodic channel feedback) physical downlink control signal (PDCCH) shown in FIG. 7.

FIG. 14 is a diagram showing an example of transmission/reception of signals between the mobile station apparatus and base station apparatus corresponding to the case where a channel feedback report dedicated request is designated by a persistent (or periodic channel feedback) physical downlink control signal (PDCCH) shown in FIG. 7. The mobile station apparatus and base station apparatus beforehand make settings for persistent scheduling by transmitting and receiving RRC signaling. The settings include a cell-radio network temporary identity (C-RNTI) that is the mobile station identity indicative of for activation of persistent scheduling, period (transmission interval) and the like.

The base station apparatus transmits a persistent uplink grant to the mobile station apparatus in the physical downlink control signal (PDCCH) in D-subframe#2. This uplink grant includes neither a channel feedback report request nor a channel feedback report dedicated request. The mobile station apparatus receiving the normal persistent uplink grant in D-subframe#2 transmits uplink data (UL-SCH) on the PUSCH without including the channel feedback report CFR at 2-subframe intervals (assuming that the transmission interval is set at two subframes (2 ms) by RRC signaling) from U-subframe#6. The base station apparatus transmits a persistent uplink grant of "no uplink resource allocation" in the physical downlink control signal (PDCCH) in D-subframe#18.

Herein, "no uplink resource allocation" is identified by the resource allocation information included in the uplink grant being a beforehand determined particular value. The mobile station apparatus receiving the persistent uplink grant of "no uplink resource allocation" in D-subframe#18 halts transmission of uplink data (UL-SCH) with persistent resources.

In addition, when a temporary channel feedback report is requested in a subframe for transmission of uplink data (UL-SCH) with persistent resources or transmission of periodic channel feedback, the mobile station apparatus transmits the uplink data (UL-SCH) and temporary channel feedback report with resources in response to the uplink grant for requesting the temporary channel feedback report. In other words, the temporary channel feedback report is written over transmission of the uplink data (UL-SCH) with persistent resources and transmission of periodic channel feedback.

Further, when a temporary channel feedback report dedicated transmission is requested in a subframe for transmission of uplink data (US-SCH) with persistent resources or transmission of periodic channel feedback, the mobile station apparatus transmits the temporary channel feedback report with resources in response to the uplink grant for requesting the temporary channel feedback report without including the uplink data (UL-SCH). Meanwhile, when an uplink grant that does not include a temporary channel feedback report request is received in a subframe for transmission of uplink data (UL-SCH) with persistent resources, the uplink data (UL-SCH) is transmitted with resources in response to the uplink grant. Further, when an uplink grant that does not include a temporary channel feedback report request is received in a subframe for transmission of periodic channel feedback, the periodic channel feedback report is transmitted with resources in response to the uplink grant.

FIGS. 10 to 14 are described based on interpretation of the persistent (or periodic channel feedback) physical downlink control signal (PDCCH) as shown in FIG. 7, but can be applicable to the persistent (or periodic channel feedback) physical downlink control signal (PDCCH) as shown in FIGS. 8 and 9 with ease.

As described above, according to Embodiment 1, it is possible to activate persistent scheduling of PUSCH for uplink data and PUSCH persistent allocation for the periodic channel feedback report CFR using a common instruction signal. By this means, the system design can be simplified. Further, the base station apparatus is able to dynamically switch between the dynamically persistent channel feedback report and temporary channel feedback report in response to use status of uplink resources, downlink channel state, downlink data buffer amount, etc. Furthermore, the base station apparatus is able to dynamically start periodic channel feedback and aperiodical channel feedback. Moreover, it is possible to dynamically change transmission of only channel feedback and concurrent transmission of channel feedback and uplink data.

Embodiment 2

For convenience in description, Embodiment 1 describes as an example the case where the base station apparatus and mobile station apparatus is one-to-one, but is naturally applicable to the case that there are pluralities of base station apparatuses and mobile station apparatuses. Further, the mobile station apparatus is not limited to moving terminals, and is applicable to cases that the base station apparatus or fixed terminal is installed with the functions of the mobile station apparatus. Furthermore, in the above-mentioned Embodiment, programs for implementing each function in the base station apparatus and each function in the mobile station apparatus are stored in a computer readable storage medium, the programs stored in the storage medium is read by a computer system to execute, and control of the base station apparatus and mobile station apparatus can thereby be performed. In addition, the "computer system" described herein includes OS, hardware such as peripheral apparatuses, etc.

Further, the "computer readable storage medium" means transportable media such as flexible discs, magneto-optical disks, ROM, CD-ROM, etc. and storage devices such as hard disks, etc. built into the computer system. Furthermore, the "computer readable storage medium" includes media for dynamically holding the program during a short time such as a communication line when the program is transmitted via a network such as the Internet, etc. or a communication channel such as the telephone line, etc, and media for holding the program for a certain time such as volatile memory inside the computer system that is a server or client in the aforementioned case. Still furthermore, the above-mentioned program may be to implement a part of the functions as described previously, and moreover, may be implemented by a combination with a program of the functions as described previously already stored in the computer system.

As described above, in this Embodiment, it is possible to adopt the following structures. In other words, the mobile station apparatus according to this Embodiment is characterized by selecting either one of persistently allocated uplink resources and temporarily allocated uplink resources as uplink resources to transmit a channel feedback report based on information included in a downlink control signal for performing uplink resource allocation received from a base station apparatus.

Thus, the mobile station apparatus selects either one of persistently allocated uplink resources and temporarily allocated uplink resources as uplink resources to transmit a channel feedback report based on the information included in a downlink control signal, and is thereby capable of efficiently switching between persistently and temporarily allocated uplink resources. The base station apparatus is able to dynamically switch between dynamically persistent and temporary channel feedback reports in response to use status of uplink resources, downlink channel state, downlink buffer amount and the like. As a result, the mobile station apparatus can transmit a channel feedback report to the base station apparatus using an efficient signal. Furthermore, it is possible to simplify the system design.

Further, the mobile station apparatus according to this Embodiment is characterized by transmitting the uplink data and channel feedback report to the base station apparatus with persistently allocated uplink resources when the downlink control signal includes information for requesting the channel feedback report, while transmitting the uplink data to the base station apparatus with persistently allocated uplink resources when the downlink control signal does not include the information for requesting the channel feedback report.

Thus, when the downlink control signal includes the information for requesting the channel feedback report, the mobile station apparatus transmits the uplink data and channel feedback report to the base station apparatus with persistently allocated uplink resources, persistent scheduling of uplink data and periodic channel feedback report are thereby concurrently set, and it is possible to share the both mechanisms. Further, since the channel feedback report is transmitted concurrently with the uplink data, it is possible to effectively use resources and consumed power. Meanwhile, when the downlink control signal does not include the information for requesting the channel feedback report, the mobile station apparatus transmits the uplink data to the base station apparatus with persistently allocated uplink resources, and is thereby able to dynamically switch between concurrent transmission of the channel feedback report and uplink data and transmission of only the uplink data.

Further, the mobile station apparatus according to this Embodiment is characterized by transmitting a channel feedback report to the base station apparatus with persistently allocated uplink resources when the downlink control signal includes information for requesting only the channel feedback report without including uplink data.

Thus, when the downlink control signal includes information for requesting only the channel feedback report without including uplink data, the mobile station apparatus transmits the channel feedback report to the base station apparatus with persistently allocated uplink resources, and is thereby capable of switching between transmission of only the channel feedback report and concurrent transmission of the channel feedback report and uplink data. Moreover, the mobile station apparatus can transmit the channel feedback report to the base station apparatus using an efficient signal.

Further, the mobile station apparatus according to this Embodiment is characterized by halting operation of transmitting a channel feedback report to the base station apparatus with persistently allocated uplink resources when the downlink control signal includes information indicative of no resource allocation.

Thus, when the downlink control signal includes information indicative of no resource allocation, the mobile station apparatus halts operation of transmitting a channel feedback report to the base station apparatus with persistently allocated uplink resources, and is thereby able to dynamically switch between transmission and transmission halt of the channel feedback report.

Further, the mobile station apparatus according to this Embodiment is a mobile station apparatus for performing radio communications with a base station apparatus, and is characterized by having a mobile station side receiving section for receiving a downlink control signal for performing uplink resource allocation from the base station apparatus, a selecting section for selecting either one of persistently allocated uplink resources and temporarily allocated uplink resources as resources to transmit a channel feedback report to the base station apparatus based on information included in the downlink control signal, and a mobile station side transmitting section for transmitting the channel feedback report to the base station apparatus with the selected uplink resources.

Thus, the mobile station apparatus selects either one of persistently allocated uplink resources and temporarily allocated uplink resources as uplink resources to transmit a channel feedback report based on information included in the downlink control signal, and is thereby capable of efficiently switching between persistently and temporarily allocated uplink resources. As a result, the mobile station apparatus can transmit a channel feedback report to the base station apparatus using an efficient signal. Moreover, it is possible to simplify the system design.

Further, a base station apparatus according to this Embodiment is characterized by including information for enabling a mobile station apparatus to select either one of persistently allocated uplink resources and temporarily allocated uplink resources as uplink resources to transmit a channel feedback report in a downlink control signal for performing uplink resource allocation to transmit.

Thus, the base station apparatus includes the information for enabling a mobile station apparatus to select either one of persistently allocated uplink resources and temporarily allocated uplink resources as uplink resources to transmit a channel feedback report in a downlink control signal for performing uplink resource allocation to transmit, and is thus capable of efficiently switching between persistently and temporarily allocated uplink resources. As a result, the base station apparatus is able to request the mobile station apparatus to transmit the channel feedback report using an efficient signal. Moreover, it is possible to simplify the system design.

Further, the base station apparatus according to this Embodiment is characterized by requesting the mobile station apparatus to transmit the uplink data and channel feedback report with persistently allocated uplink resources by including information for requesting the channel feedback report in the downlink control signal, while requesting the mobile station apparatus to transmit the uplink data with persistently allocated uplink resources by not including the information for requesting the channel feedback report in the downlink control signal.

Thus, by including the information for requesting the channel feedback report in the downlink control signal, the base station apparatus requests the mobile station apparatus to transmit the uplink data and channel feedback report with persistently allocated uplink resources, the mobile station apparatus is thereby concurrently set for persistent scheduling of uplink data and periodic channel feedback report, and it is thus possible to share both the mechanisms. Further, the base station apparatus instructs the mobile station apparatus to transmit the channel feedback report concurrently with the uplink data, and it is thereby possible to effectively use resources and consumed power. Furthermore, by not including the information for requesting the channel feedback report in the downlink control signal, the base station apparatus requests the mobile station apparatus to transmit the uplink data with persistently allocated uplink resources, and is thereby able to enable the mobile station apparatus to dynamically switch between concurrent transmission of the channel feedback report and uplink data and transmission of only the uplink data.

Further, the base station apparatus according to this Embodiment is characterized by requesting the mobile station apparatus to transmit a channel feedback report with persistently allocated uplink resources by including information for requesting only the channel feedback report in a downlink control signal without including uplink data.

Thus, the base station apparatus requests the mobile station apparatus to transmit a channel feedback report with persistently allocated uplink resources by including the information for requesting only the channel feedback report in the downlink control signal without including uplink data, and the mobile station apparatus is thereby capable of dynamically switching between transmission of only the channel feedback report and concurrent transmission of the channel feedback report and uplink data. Moreover, the base station apparatus can request the mobile station apparatus to transmit the channel feedback report using an efficient signal.

Further, the base station apparatus according to this Embodiment is characterized by requesting the mobile station apparatus to halt operation of transmitting a channel feedback report with persistently allocated uplink resources by including information indicative of no resource allocation in the downlink control signal.

Thus, by including the information indicative of no resource allocation in the downlink control signal, the base station apparatus requests the mobile station apparatus to halt operation of transmitting a channel feedback report with persistently allocated uplink resources, and the mobile station apparatus is thereby capable of dynamically switching between transmission and transmission halt of the channel feedback report.

Further, the base station apparatus according to this Embodiment is a base station apparatus for performing radio communications with a mobile station apparatus, and is characterized by having a scheduling section for generating information for assigning either one of persistently allocated uplink resources and temporarily allocated uplink resources to the mobile station apparatus as uplink resources to transmit a channel feedback report based on information including a channel feedback report received from the mobile station apparatus and scheduling information input from a higher layer, and performing scheduling for including the generated information in a downlink control signal for performing uplink resource allocation, and a base station side transmitting section for transmitting the downlink control signal to the mobile station apparatus.

Thus, the base station apparatus includes the information for the mobile station apparatus to select either one of persistently allocated uplink resources and temporarily allocated uplink resources as uplink resources to transmit a channel feedback report in a downlink control signal for performing uplink resource allocation to transmit, and the mobile station apparatus is thereby capable of efficiently switching between persistently and temporarily allocated uplink resources. As a result, the base station apparatus can request the mobile station apparatus to transmit the channel feedback report using an efficient signal. Moreover, it is possible to simplify the system design.

Further, a communication system according to this Embodiment is characterized by being comprised of the mobile station apparatus and base station apparatus as described previously.

According to this structure, the base station apparatus includes the information for the mobile station apparatus to select either one of persistently allocated uplink resources and temporarily allocated uplink resources as uplink resources to transmit a channel feedback report in a downlink control signal for performing uplink resource allocation to transmit, and the mobile station apparatus is thereby capable of efficiently switching between persistently and temporarily allocated uplink resources. As a result, the base station apparatus can request the mobile station apparatus to transmit the channel feedback report using an efficient signal. Moreover, it is possible to simplify the system design.

Further, the mobile station apparatus according to this Embodiment is a mobile station apparatus for determining an space of a downlink control signal to search based on a mobile station identity received from a base station apparatus, and is characterized by searching a search space of a downlink control signal corresponding to one mobile station identity for a plurality of mobile station identities when the mobile station apparatus holds the plurality of mobile station identities.

Thus, when the mobile station apparatus holds a plurality of mobile station identities, the mobile station apparatus searches the search space of a downlink control signal corresponding to one mobile station identity for the plurality of mobile station identities, and it is thereby possible to limit the search space. As a result, since the need of decoding a plurality of times is eliminated, it is possible to reduce power consumption and to decrease the circuit scale.

Further, the mobile station apparatus according to this Embodiment is a mobile station apparatus for determining an space of a downlink control signal to search based on a mobile station identity received from a base station apparatus, and is characterized by searching a search space of a common downlink control signal that does not depend on the mobile station identity for a mobile station identity for persistent scheduling when the mobile station apparatus holds the plurality of mobile station identities.

Thus, when the mobile station apparatus holds a plurality of mobile station identities, the mobile station apparatus searches the search space of a common downlink control signal that does not depend on the mobile station identity for the mobile station identity for persistent scheduling, thus searches for another cell-radio network temporary identity for persistent scheduling or periodic channel feedback, while maintaining the search space (also referred to as a search area) of the physical downlink control signal, and is capable of reducing the processing.

Further, the base station apparatus according to this Embodiment is a base station apparatus for transmitting a mobile station identity to a mobile station apparatus, and thereby defining an space of a downlink control signal for the mobile station apparatus to search, and is characterized by placing downlink control signals including respective mobile station identities in a search space of a downlink control signal corresponding to one mobile station identity when the base station apparatus assigns a plurality of mobile station identities to the mobile station apparatus.

Thus, when the base station apparatus assigns a plurality of mobile station identities to the mobile station apparatus, the base station apparatus places downlink control signals respectively including the mobile station identities in a search space of a downlink control signal corresponding to one mobile station identity, and is thereby capable of limiting the search space in the mobile station apparatus. As a result, in the mobile station apparatus, since the need of performing decoding many times is eliminated, it is possible to reduce power consumption, and to decrease the circuit scale.

Further, the base station apparatus according to this Embodiment is a base station apparatus for transmitting a mobile station identity to a mobile station apparatus, and thereby defining an space of a downlink control signal for the mobile station apparatus to search, and is characterized by placing a downlink control signal including a mobile station identity for persistent scheduling in a search space of a common downlink control signal that does not depend on the mobile station identity when the base station apparatus assigns a plurality of mobile station identities to the mobile station apparatus.

Thus, when the base station apparatus assigns a plurality of mobile station identities to the mobile station apparatus, since the base station apparatus places a downlink control signal including a mobile station identity for persistent scheduling in the search space of a common downlink control signal that does not depend on the mobile station identity, the mobile station apparatus thereby searches for another cell-radio network temporary identity for persistent scheduling or periodic channel feedback, while maintaining the search space (also referred to as a search area) of the physical downlink control signal, and is able to reduce the processing.

In the forgoing, the Embodiments of the invention are described specifically with reference to the drawings, but specific structures are not limited to the Embodiments, and designs and others in the scope without departing from the subject matter of the invention are included in the scope of claims.

DESCRIPTION OF SYMBOLS

- 100 Base station apparatus
- 101 Data control section
- 102 OFDM modulation section
- 103 Radio section
- 104 Scheduling section
- 105 Channel estimation section
- 106 DFT-S-OFDM demodulation section
- 107 Data extraction section
- 108 Higher layer
- 109 Radio resource control section
- 200 Mobile station apparatus
- 201 Data control section
- 202 DFT-S-OFDM modulation section
- 203 Radio section
- 204 Scheduling section
- 205 Channel estimation section
- 206 OFDM demodulation section
- 207 Data extraction section
- 208 Higher layer
- 209 Radio resource control section

The invention claimed is:

1. A mobile communication system comprising:
a base station; and
a mobile station communicating with the base station,
wherein the base station is configured to transmit, to the mobile station, a physical downlink control channel (PDCCH) in a search space, the search space comprising a plurality of resource elements, the search space corresponding to a cell-radio network temporary identity (C-RNTI) for dynamic scheduling, the PDCCH transmitted by the base station in the search space including both a C-RNTI for persistent scheduling and resource allocation information, and
wherein the mobile station is configured to:
search for the PDCCH in the search space, the search space being located by the mobile station according to the C-RNTI for dynamic scheduling;
decode the PDCCH according to the C-RNTI for persistent scheduling, when the mobile station has both the C-RNTI for dynamic scheduling and the C-RNTI for persistent scheduling, and
determine to deactivate scheduling of data transmission on persistently-allocated resources, with consideration of a value of the resource allocation information, when the PDCCH includes the C-RNTI for persistent scheduling.

2. The mobile communication system according to claim 1, wherein the configuration of the mobile station to determine to deactivate the scheduling of the data transmission on the persistently-allocated resources, includes configuring the mobile station to:
determine that a value of the resource allocation information is a value predefined for deactivation.

3. A processing method in a mobile station comprising:
searching for a physical downlink control channel (PDCCH) in a search space, the search space comprising a plurality of resource elements and being located by the mobile station according to a cell-radio network temporary identity (C-RNTI) for dynamic scheduling;
decoding the PDCCH according to a C-RNTI for persistent scheduling, when the mobile station has both the C-RNTI for dynamic scheduling and the C-RNTI for persistent scheduling, wherein the PDCCH includes both the C-RNTI for persistent scheduling and resource allocation information;
determining to deactivate scheduling of data transmission on persistently-allocated resources, with consideration of a value of the resource allocation information, when the PDCCH includes the C-RNTI for persistent scheduling.

4. The method according to claim 3, wherein the determining to deactivate scheduling of data transmission on persistently-allocated resources, comprising:
determining that a value of the resource allocation information is a value predefined for deactivation.

5. A processing method in a base station comprising:
transmitting, to a mobile station, a physical downlink control channel (PDCCH) in a search space, the search space comprising a plurality of resource elements, the search space corresponding to a cell-radio network temporary identity (C-RNTI) for dynamic scheduling,
wherein the PDCCH includes both a C-RNTI for persistent scheduling and resource allocation information when a mobile station has both the C-RNTI for dynamic scheduling and the C-RNTI for persistent scheduling,
wherein the PDCCH is designated to be searched in the search space, the search space being located by the mobile station according to the C-RNTI for dynamic scheduling,
wherein the PDCCH is further designated to be decoded by the mobile station according to the C-RNTI for persistent scheduling, and wherein a value of the resource allocation information is designated to direct the mobile station to deactivate data transmission on persistently-allocated resources.

6. A mobile station comprising at least one processor and a memory coupled to the processor, wherein the processor is configured to:
   search for a physical downlink control channel (PDCCH) a search space, the search space comprising a plurality of resource elements and being located by the mobile station according to a cell-radio network temporary identity (C-RNTI) for dynamic scheduling;
   decode the PDCCH according to a C-RNTI for persistent scheduling, when the mobile station has both the C-RNTI for dynamic scheduling and the C-RNTI for persistent scheduling, wherein the PDCCH includes both the C-RNTI for persistent scheduling and resource allocation information; and
   determine to deactivate scheduling of data transmission on persistently-allocated resources, with consideration of a value of the resource allocation information, when the PDCCH includes the C-RNTI for persistent scheduling.

7. The mobile station according to claim 6, the configuration of the processor to determine to deactivate the scheduling of the data transmission on the persistently-allocated resources, includes configuring the processor to:
determine that a value of the resource allocation information is a value predefined for deactivation.

8. A base station comprising:
   a processor; and
   a transmitter configured to transmit, to a mobile station, a physical downlink control channel (PDCCH) in a search space, the search space comprising a plurality of resource elements, the search space corresponding to a cell-radio network temporary identity (C-RNTI) for dynamic scheduling,
   wherein the PDCCH includes both a C-RNTI for persistent scheduling and resource allocation information when a mobile station has both the C-RNTI for dynamic scheduling and the C-RNTI for persistent scheduling,
   wherein the PDCCH is designated to be searched in the search space, the search space being located by the mobile station according to the C-RNTI for dynamic scheduling,
   wherein the PDCCH is further designated to be decoded by the mobile station according to the C-RNTI for persistent scheduling, and
   wherein a value of the resource allocation information is designated to direct the mobile station to deactivate data transmission on persistently-allocated resources.

* * * * *